(12) United States Patent
Sakai et al.

(10) Patent No.: US 9,088,860 B2
(45) Date of Patent: Jul. 21, 2015

(54) COMMUNICATION APPARATUS, COMMUNICATION METHOD, COMPUTER PROGRAM, AND STORAGE MEDIUM FOR SETTING WIRELESS COMMUNICATION PARAMETERS

(75) Inventors: Tatsuhiko Sakai, Tokyo (JP); Fumihide Goto, Naka-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/122,558

(22) PCT Filed: Sep. 28, 2009

(86) PCT No.: PCT/JP2009/067284
§ 371 (c)(1),
(2), (4) Date: Apr. 4, 2011

(87) PCT Pub. No.: WO2010/041613
PCT Pub. Date: Apr. 15, 2010

(65) Prior Publication Data
US 2011/0191473 A1 Aug. 4, 2011

(30) Foreign Application Priority Data

Oct. 6, 2008 (JP) ................................. 2008-259998

(51) Int. Cl.
*H04W 8/00* (2009.01)
(52) U.S. Cl.
CPC ..................................... *H04W 8/005* (2013.01)
(58) Field of Classification Search
CPC ................................................... H04W 8/005
See application file for complete search history.

(56) References Cited

U.S. PATENT DOCUMENTS 6,445,283 B1 9/2002 Pang et al.
7,916,663 B2 * 3/2011 Yee ................................ 370/254

(Continued)

FOREIGN PATENT DOCUMENTS

| CN | 1973487 A | 5/2007 |
|---|---|---|
| JP | 2007-228249 A | 2/2006 |

(Continued)

OTHER PUBLICATIONS

Yanfeng Zhu; Zhisheng Niu; Qian Zhang; Bo Tan; Zhi Zhou; Jing Zhu, "A Multi-AP Architecture for High-Density WLANs: Protocol Design and Experimental Evaluation," Sensor, Mesh and Ad Hoc Communications and Networks, 2008. SECON '08. 5th Annual IEEE Communications Society Conference on, vol., no., pp. 28 to 36, Jun. 16-20, 2008 doi: 10.1109/SAHCN.2008.*

(Continued)

*Primary Examiner* — Andrew Lai
*Assistant Examiner* — Hoyet H Andrews
(74) *Attorney, Agent, or Firm* — Carter, DeLuca, Farrell & Schmidt, LLP

(57) ABSTRACT

Even if the roles of apparatuses are not decided in advance when automatically setting communication parameters, communication parameter setting processing and network joining processing are appropriately executed without requiring the user to select the roles of apparatuses. The invention is characterized by a communication method for a communication apparatus, including a first search step of searching for a communication partner apparatus on a predetermined communication channel, a second search step of searching for a communication partner apparatus on all communication channels available for communication, and a search control step of searching for a communication partner apparatus using the first and second search steps.

27 Claims, 17 Drawing Sheets

(56) References Cited

U.S. PATENT DOCUMENTS

| | | | |
|---|---|---|---|
| 7,949,358 B2 * | 5/2011 | Wentink et al. | 455/515 |
| 8,054,852 B2 * | 11/2011 | Yamada et al. | 370/445 |
| 8,089,927 B2 * | 1/2012 | Matsuo et al. | 370/329 |
| 8,178,457 B2 | 5/2012 | de Rochemont | |
| 8,243,622 B2 * | 8/2012 | Shin et al. | 370/254 |
| 8,248,961 B2 * | 8/2012 | Fujii | 370/252 |
| 8,280,349 B2 * | 10/2012 | Ishikawa et al. | 455/410 |
| 8,289,987 B2 * | 10/2012 | Adachi et al. | 370/445 |
| 2002/0085516 A1 | 7/2002 | Bridgelall | |
| 2003/0203741 A1 * | 10/2003 | Matsuo et al. | 455/519 |
| 2005/0094608 A1 * | 5/2005 | Yokota | 370/338 |
| 2006/0142034 A1 * | 6/2006 | Wentink et al. | 455/515 |
| 2006/0166695 A1 | 7/2006 | Morich | |
| 2006/0176846 A1 * | 8/2006 | Miki et al. | 370/328 |
| 2006/0268744 A1 * | 11/2006 | Sakai et al. | 370/254 |
| 2007/0088951 A1 | 4/2007 | Nakajima | |
| 2007/0091864 A1 * | 4/2007 | Honjo et al. | 370/338 |
| 2007/0110084 A1 * | 5/2007 | Bennett | 370/401 |
| 2007/0140163 A1 | 6/2007 | Meier et al. | |
| 2007/0197238 A1 * | 8/2007 | Nakajima | 455/466 |
| 2008/0049702 A1 | 2/2008 | Meylan et al. | |
| 2008/0089300 A1 | 4/2008 | Yee | |
| 2009/0097464 A1 * | 4/2009 | Sakoda | 370/338 |
| 2009/0310583 A1 * | 12/2009 | Suzuki | 370/338 |
| 2010/0020706 A1 | 1/2010 | Fujii | |
| 2010/0046394 A1 | 2/2010 | Fujii et al. | |
| 2011/0149937 A1 * | 6/2011 | Gupta et al. | 370/338 |
| 2011/0191473 A1 * | 8/2011 | Sakai et al. | 709/224 |
| 2012/0063327 A1 * | 3/2012 | Sakai | 370/242 |
| 2012/0147871 A1 * | 6/2012 | Nakamura | 370/338 |

FOREIGN PATENT DOCUMENTS

| | | | |
|---|---|---|---|
| JP | 2006-311139 A | 11/2006 | |
| JP | 2006-345205 A | 12/2006 | |
| JP | 2008-187348 A | 8/2008 | |
| JP | 2009-545924 A | 12/2009 | |
| WO | 2008/019140 A | 2/2008 | |
| WO | 2008/050622 A | 5/2008 | |
| WO | WO 2008050622 A1 * | 5/2008 | |
| WO | 2008/093817 A | 8/2008 | |
| WO | WO 2008/093817 * | 8/2008 | 370/242 |
| WO | WO 2008093817 A1 * | 8/2008 | |

OTHER PUBLICATIONS

Rui Zhao; Walke, B.; Hiertz, G.R., "An Efficient IEEE 802.11 ESS Mesh Network Supporting Quality-of-Service," Selected Areas in Communications, IEEE Journal on , vol. 24, No. 11, pp. 2005,2017, Nov. 2006 doi: 10.1109/JSAC.2006.881635.*

Manivannan, N.; Neelameham, P., "Alternative Pair-wise Key Exchange Protocols (IEEE 802.11i) in Wireless LANs," Wireless and Mobile Communications, 2006. ICWMC '06. International Conference on, vol., no., pp. 52, 52, Jul. 29-31, 2006 doi: 10.1109/ICWMC.2006.18.*

"Adaptive CSMA for Scalable Network Capacity in High-Density WLAN: A Hardware Prototyping Approach" Jing Zhu ; Metzler, B. ; Xingang Guo ; Liu, Y. ,INFOCOM 2006. 25th IEEE International Conference on Computer Communications. Proceedings Digital Object Identifier: 10.1109/INFOCOM.2006.174 Publication Year: 2006 , pp. 1-10.*

"Adaptive CSMA for Scalable Network Capacity in High-Density WLAN: A Hardware Prototyping Approach", Jing Zhu; Metzler, B. ; Xingang Guo ; Liu, Y. ,INFOCOM 2006. 25th IEEE International Conference on Computer Communications. Proceedings Digital Object Identifier: 10.1109/INFOCOM.2006.174, Publication Year: 2006, pp. 1-10.*

L. Yang, P. Zerfos, E. Sadot; Request for Comments: 4118, titled Architecture Taxonomy for Control and Provisioning of Wireless Access Points (CAPWAP), Network Working Group: Category: Informational; Jun. 2005, (hereinafter Yang et al.).*

L. Yang, P. Zerfos, E. Sadot; Request for Comments: 4118, titled Architecture Taxonomy for Control and Provisioning of Wireless Access Points (CAPWAP), Network Working Group: Category: Informational; Jun. 2005.*

Adaptive CSMA for Scalable Network Capacity in High-Density WLAN: A Hardware Prototyping Approach, Jing Zhu; Metzler, B.; Xingang Guo ; Liu, Y. ,INFOCOM 2006. 25th IEEE International Conference on Computer Communications. Proceedings Digital Object Identifier: 10.1109/INFOCOM.2006.174, Publication Year: 2006, pp. 1-10.*

U.S. Appl. No. 12/996,484, filed Dec. 6, 2010, Fumihide Goto.
U.S. Appl. No. 12/989,070, filed Oct. 21, 2010, Tatsuhiko Sakai.
U.S. Appl. No. 12/988,781, filed Oct. 20, 2010, Tatsuhiko Sakai.
U.S. Appl. No. 13/131,581, filed May 26, 2011, Hideaki Tachibana.
U.S. Appl. No. 13/061,124, filed Feb. 25, 2011, Tatsuhiko Sakai.
U.S. Appl. No. 13/125,952, filed Apr. 25, 2011, Kenichi Fujii.
U.S. Appl. No. 13/124,203, filed Apr. 14, 2011, Fumihide Goto.
U.S. Appl. No. 13/122,619, filed Apr. 5, 2011, Fumihide Goto.
U.S. Appl. No. 13/120,535, filed Mar. 23, 2011, Fumihide Goto.
Japanese Office Action issued on Jun. 28, 2013 in corresponding application No. 2008-259998.
Chinese Office Action issued in corresponding application No. 200980139671.3 on Apr. 3, 2013.
Japanese Office Action issued in corresponding application No. 2012-241073 on Nov. 25, 2013.
"Easing the User Experience for Home and Small Office Wi-Fi Networks" (URL: http://www.wi-fi.org/wp/wifi-protected-setup).
"Wi-Fi Protected Access Enhanced Security Implementation Based on IEEEP802.11i standard".

* cited by examiner

FIG. 10

SUPPORTED AUTHENTICATION / ENCRYPTION METHODS

| AUTHENTICATION METHOD | ENCRYPTION METHOD |
|---|---|
| Open | NO ENCRYPTION |
| Open | WEP |
| Shared | WEP |
| WPA | TKIP |
| WPA | CCMP |
| WPA-PSK | TKIP |
| WPA-PSK | CCMP |
| WPA2 | TKIP |
| WPA2 | CCMP |
| WPA2-PSK | TKIP |
| WPA2-PSK | CCMP |

FIG. 11

NUMBER OF HELD KEYS

| METHOD | pairwise key | group key | total |
|---|---|---|---|
| IEEE802.11i full spec | n − 1 | n + 1 | 2n |
| (1) reduce Seq | n − 1 | n + 1 | 2n |
| (2) reduce Key | n − 1 | 1 | n |
| (3) WPA-None | 0 | 1 | 1 |
| (4) WPA Key Exchange over WPS handshake | n − 1 | n + 1 or 1 | 2n or n |

NUMBER OF TIMES OF KEY EXCHANGE EXECUTED FOR EACH PAIRING APPARATUS

| METHOD | 4-Way Handshake | Group Key Handshake |
|---|---|---|
| IEEE802.11i full spec | 2 | 2 |
| (1) reduce Seq | 1 | 2 |
| (2) reduce Key | 1 or 2 | 1 |
| (3) WPA-None | 0 | 0 |
| (4) WPA Key Exchange over WPS handshake | 0 | 0 or 1 or 2 |

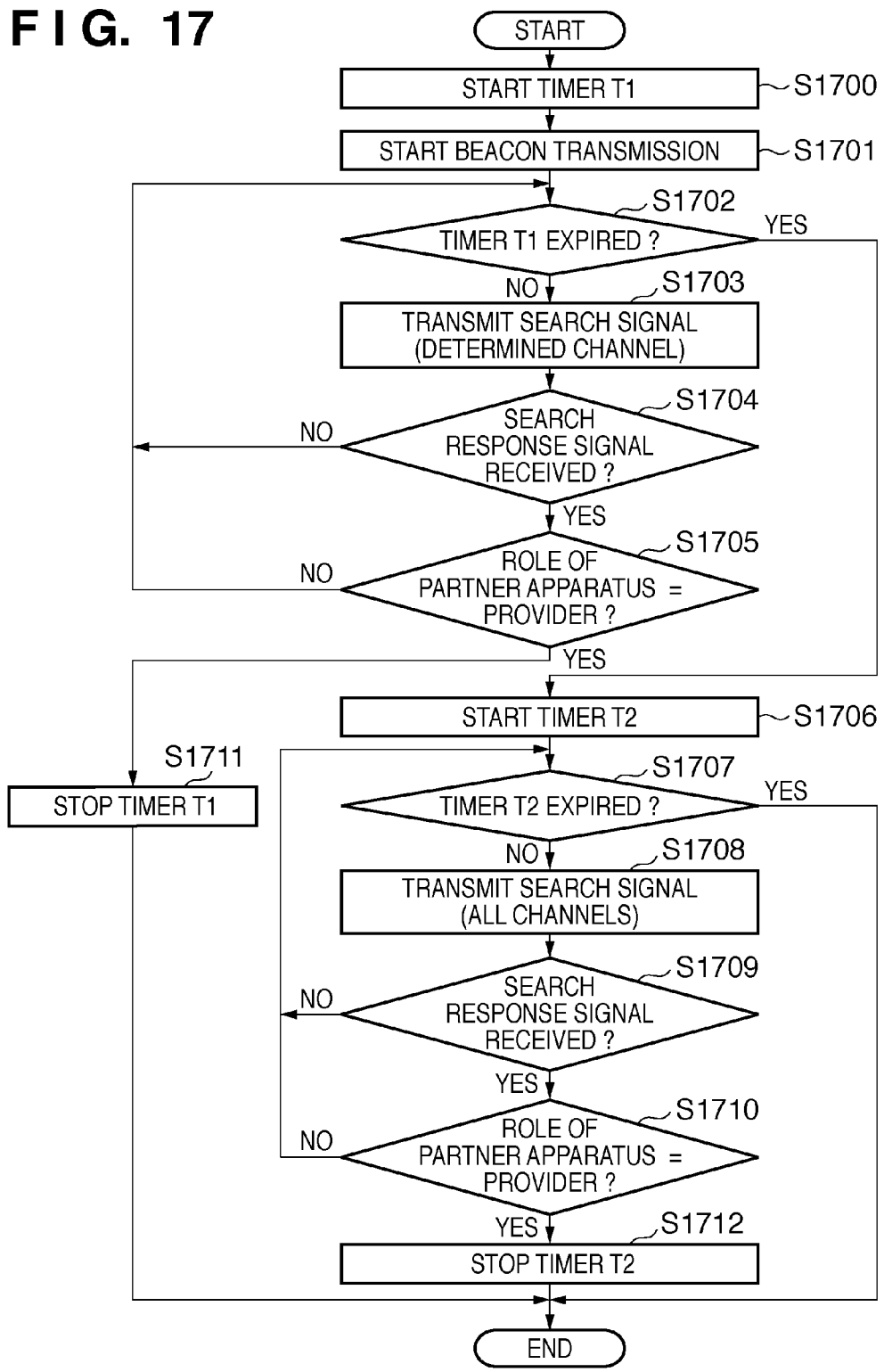
F I G. 17

COMMUNICATION APPARATUS, COMMUNICATION METHOD, COMPUTER PROGRAM, AND STORAGE MEDIUM FOR SETTING WIRELESS COMMUNICATION PARAMETERS

TECHNICAL FIELD

The present invention relates to a communication apparatus, a communication method, a computer program, and a storage medium.

BACKGROUND ART

In wireless communication represented by a wireless LAN complying with the IEEE802.11 standard series, there are many setting items to be set in advance. For example, the setting items include communication parameters necessary for wireless communication, such as an SSID as a network identifier, an encryption method, an encryption key, an authentication method, and an authentication key. It is very troublesome for a user to set such communication parameters by manual input.

Various manufacturers have proposed automatic setting methods for easily setting communication parameters in a wireless apparatus. In those automatic setting methods, one apparatus provides another apparatus with communication parameters using a procedure predetermined between these connected apparatuses and a message, thereby automatically setting the communication parameters.

Japanese Patent Laid-Open No. 2006-311139 has disclosed an example of communication parameter automatic setting in communication in a wireless LAN ad hoc mode (to be referred to as ad hoc communication hereinafter).

In addition, Wi-Fi CERTIFIED for Wi-Fi Protected Setup "Easing the User Experience for Home and Small Office Wi-Fi Networks" (URL: http://www.wi-fi.org/wp/wifi-protected-setup) (non-patent reference 1) has disclosed Wi-Fi Protected Setup (to be referred to as WPS hereinafter) as a standard in the industry for communication parameter automatic setting between an access point (base station) and a station (terminal station).

Furthermore, "Wi-Fi Protected Access Enhanced Security Implementation Based on IEEEP802.11i standard" (non-patent reference 2) has disclosed Wi-Fi Protected Access (to be referred to as WPA hereinafter) as a standard in the industry for, for example, an encryption method, an encryption key, an authentication method, and an authentication key in wireless communication connection.

In WPS, since the roles of an apparatus for providing communication parameters (to be referred to as a provider hereinafter) and an apparatus for receiving the communication parameters (to be referred to as a receiver hereinafter) are decided in advance, the communication parameter transfer direction is uniquely decided.

However, if the roles of the provider and receiver are not decided in advance, it is impossible to uniquely decide the communication parameter transfer direction. In this case, if the user has to select an apparatus to be a provider and that to be a receiver, user operability deteriorates.

Furthermore, if a plurality of apparatuses become providers, a receiver cannot determine from which provider it should receive communication parameters.

The above problems may arise when an apparatus is newly added to a network already built between a plurality of apparatuses. In this case, it is desired that an apparatus belonging to the network becomes a provider, and the apparatus newly joining the network becomes a receiver to receive the communication parameters of the network. However, since the roles of a provider and receiver are not decided in advance, it is impossible to set appropriate communication parameters in the apparatus newly joining the network.

The above problems may occur for not only communication parameters for wireless communication but also those for wired communication or the like which need to be set for communication between apparatuses.

DISCLOSURE OF INVENTION

The present invention has been made in consideration of the above problems.

The present invention is a communication apparatus characterized by comprising: first search means for searching for another communication apparatus on a predetermined communication channel; second search means for searching for another communication apparatus while switching a plurality of communication channels; and search control means for, by using the first and second search means, searching for a provider which provides communication parameters.

Furthermore, the present invention is a communication method for a communication apparatus, characterized by comprising: a first search step of searching for another communication apparatus on a predetermined communication channel; a second search step of searching for another communication apparatus while switching a plurality of communication channels; and a search control step of, by using the first and second search steps, searching for a provider which provides communication parameters.

According to the present invention, it is possible to appropriately set communication parameters without deteriorating user operability even if roles are not decided in advance when automatically setting the communication parameters.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 10 is a table showing supported authentication/encryption methods;

FIG. 11 shows comparison tables of held keys/key exchange sequences in key exchange algorithms;

FIG. 17 is a flowchart illustrating a provider search processing operation according to the first embodiment of the present invention.

BEST MODE FOR CARRYING OUT THE INVENTION

[First Embodiment]

A communication apparatus according to this embodiment will be described below in detail with reference to the accompanying drawings. A case in which a wireless LAN system complying with the IEEE802.11 standard series is used will be explained below, but the communication mode is not limited to this.

The hardware arrangement in an example according to this embodiment will be described.

Figure 1:
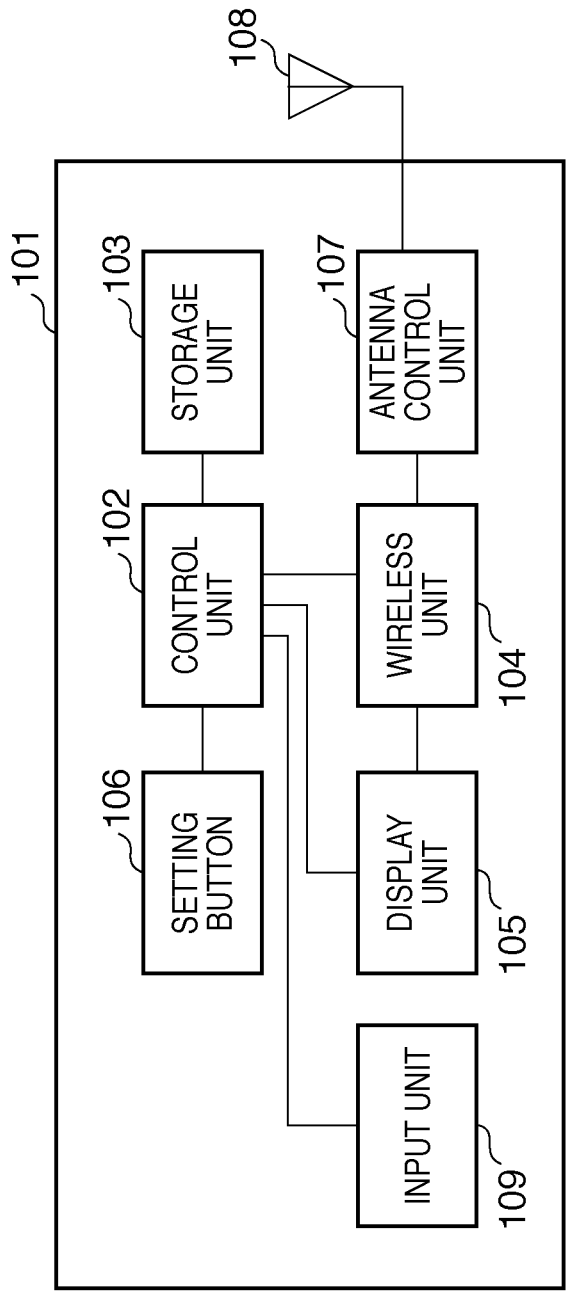
FIG. 1 is a block diagram showing the arrangement of an apparatus.

FIG. 1 is a block diagram showing an example of the arrangement of a communication apparatus (provider or receiver) according to the embodiment of the present invention. Reference numeral 101 denotes an apparatus as a whole; and 102, a control unit which controls the apparatus as a whole by executing computer programs stored in a storage unit 103. The control unit 102 also controls communication parameter setting with another apparatus. The storage unit 103 stores the computer programs executed by the control unit 102 and various kinds of information such as communication parameters. Various operations (to be described later) are performed when the control unit 102 executes the computer programs stored in the storage unit 103.

Reference numeral 104 denotes a wireless unit for wireless communication; and 105, a display unit which provides various displays and has a function of outputting visually perceivable information like an LCD or LED, or a function of outputting a sound like a loudspeaker.

Reference numeral 106 denotes a setting button which gives a trigger to start communication parameter setting processing. Upon detecting a user operation of the setting button 106, the control unit 102 performs processing (to be described later).

Reference numeral 107 denotes an antenna control unit; 108, an antenna; and 109, an input unit used for various inputs by the user.

Figure 2:
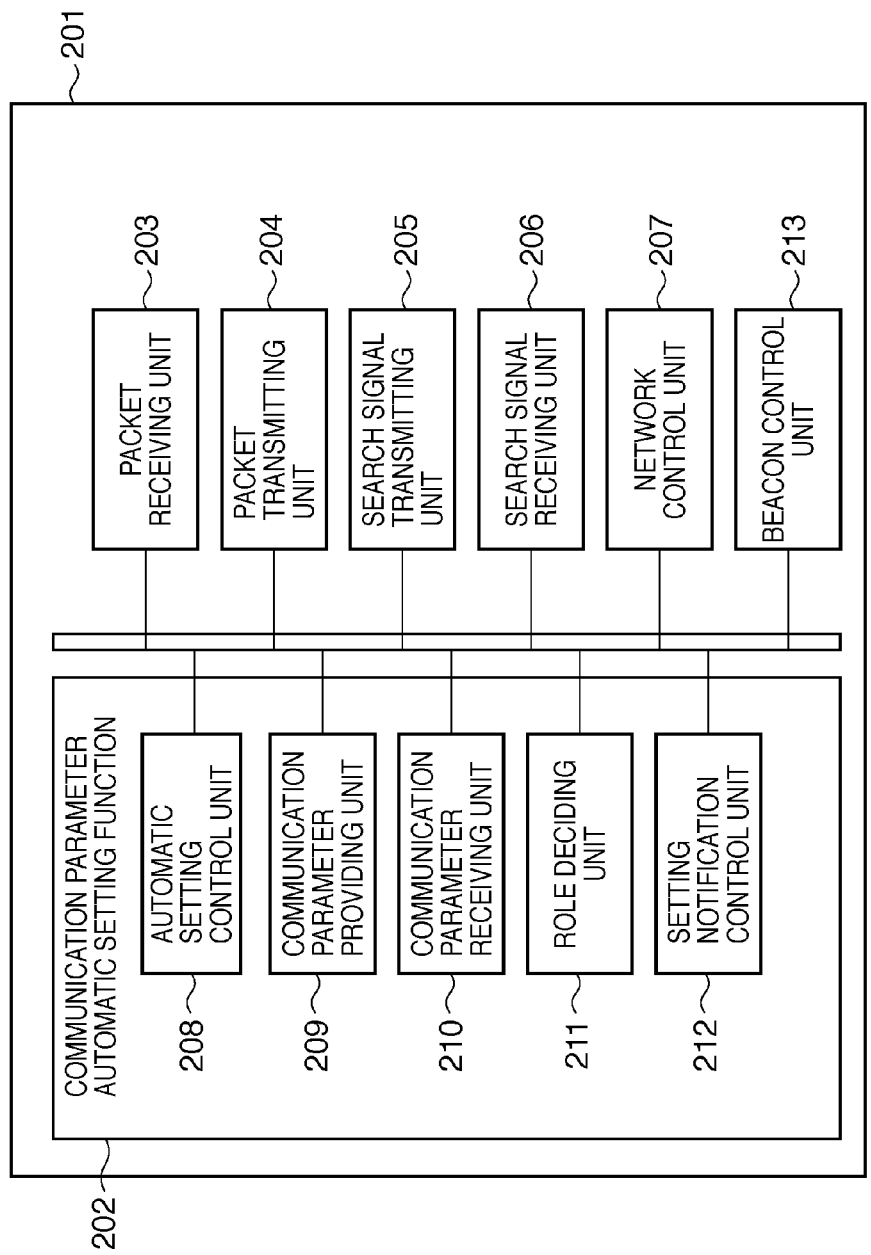
FIG. 2 is a block diagram showing software functions within an apparatus according to an embodiment of the present invention.

FIG. 2 is a block diagram showing an example of the configuration of software functional blocks (to be described later) executed by an apparatus in a communication parameter setting operation (to be described later).

Reference numeral 201 denotes an apparatus as a whole; and 202, a communication parameter automatic setting functional block, which automatically sets communication parameters necessary for wireless communication, such as an SSID as a network identifier, an encryption method, an encryption key, an authentication method, and an authentication key, in this embodiment.

Reference numeral 203 denotes a packet receiving unit which receives packets associated with various communications. The packet receiving unit 203 receives a beacon (notification signal). Reference numeral 204 denotes a packet transmitting unit which transmits packets associated with various communications. The packet transmitting unit 204 transmits a beacon. Note that a beacon is added with various kinds of information (self-information) on an apparatus as a transmission source.

Reference numeral 205 denotes a search signal transmitting unit which controls transmission of an apparatus search signal such as a probe request. Note that a probe request can also be referred to as a network search signal for searching for a desired network. The search signal transmitting unit 205 transmits a probe request. The search signal transmitting unit 205 also transmits a probe response as a response signal to a received probe request.

Reference numeral 206 denotes a search signal receiving unit which controls reception of an apparatus search signal such as a probe request from another apparatus. The search signal receiving unit 206 receives a probe request. The search signal receiving unit 206 also receives a probe response. Note that an apparatus search signal and a response signal to it are respectively added with various kinds of information (self-information) on an apparatus as a transmission source.

Reference numeral 207 denotes a network control unit which controls network connection. The network control unit 207 executes connection processing to a wireless LAN ad hoc network.

In the communication parameter automatic setting functional block, reference numeral 208 denotes an automatic setting control unit which controls various protocols in communication parameter automatic settings.

Reference numeral 209 denotes a communication parameter providing unit which provides a partner apparatus with communication parameters. The communication parameter providing unit 209 performs providing processing in communication parameter automatic settings (to be described later) under the control of the automatic setting control unit 208.

Reference numeral 210 denotes a communication parameter receiving unit which receives communication parameters from a partner apparatus. The communication parameter receiving unit 210 executes reception processing in communication parameter automatic settings (to be described later) under the control of the automatic setting control unit 208.

The automatic setting control unit 208 also determines whether an elapsed time from when communication parameter automatic setting processing starts exceeds the time limit of the setting processing. Upon determining that the elapsed time exceeds the time limit, the automatic setting control unit 208 controls to abort the setting processing.

Reference numeral 211 denotes a role deciding unit which decides roles in communication parameter automatic setting processing. The role deciding unit 211 executes role deciding processing (to be described later).

Reference numeral 212 denotes a setting notification control unit which controls processing associated with notification of the start and end of communication parameter automatic setting. The setting notification control unit 212 transmits/receives a start notification message, a start notification response message, and an end notification message in a provider (to be described later).

Reference numeral 213 denotes a beacon control unit which controls the transmission timing of a beacon (notification signal). A beacon transmission algorithm in an IEEE802.11 wireless LAN ad hoc network will now be explained.

In an ad hoc network, transmission of a beacon is performed, in autonomous distribution, between all apparatuses which form the network. An apparatus which first created the ad hoc network is supposed to determine the transmission interval of a beacon (beacon period). In general, one of the apparatuses transmits a beacon at an interval of about 100 ms. Note that when one of apparatuses in an ad hoc network starts to transmit a beacon, a network is formed.

A parameter called a contention window (a random number generation range; to be referred to as CW hereinafter) controls the transmission timing of a beacon. Each apparatus in a network obtains a random value (CWrand) within the range from zero to CW at the time of transmitting a beacon. A time obtained by multiplying CWrand by a predetermined constant interval (slot time) is defined as a standby time (back off time) before transmitting a beacon.

The standby time before transmitting a beacon is repeatedly decremented by the slot time. When the standby time becomes zero, a beacon is transmitted. If an apparatus receives a beacon from another apparatus before transmitting a beacon, it aborts beacon transmission processing.

This configuration makes it possible to prevent collision of beacons transmitted from apparatuses. Each apparatus on an ad hoc network selects a random number between zero and CW. Out of the apparatuses which form the network, an apparatus which has selected a smallest CWrand transmits a beacon.

For example, if identical CW is set as an initial value in each apparatus, the probabilities at which the apparatuses transmit beacons are equal to each other. Consequently, the numbers of times the apparatuses transmit beacons per unit time are almost equal to each other. In other words, the beacon transmission frequencies (transmission rates) by the apparatuses are equal to each other.

If one apparatus on the network sets CW to a value smaller than the initial value, the probability at which this apparatus transmits a beacon becomes higher than that by any other apparatus. That is, CW can be a parameter to determine the beacon transmission probability or that to determine the number of times beacon are transmitted per unit time.

Alternatively, CW can be a parameter to determine the transmission rate of a beacon transmitted by each apparatus. In other words, CW can be a parameter to determine a beacon transmission timing, or that to determine a standby time before transmitting a beacon.

It is possible to change the value of CW within the range from CWmin (a minimum value) to CWmax (a maximum value). If the value of CW is set to CWmin, the number of times beacons are transmitted per unit time becomes maximum. In each apparatus, CWinit (>CWmin) is set as an initial value, and thus a beacon is transmitted using the initial value while no communication parameter automatic setting processing is executed.

Figure 3:
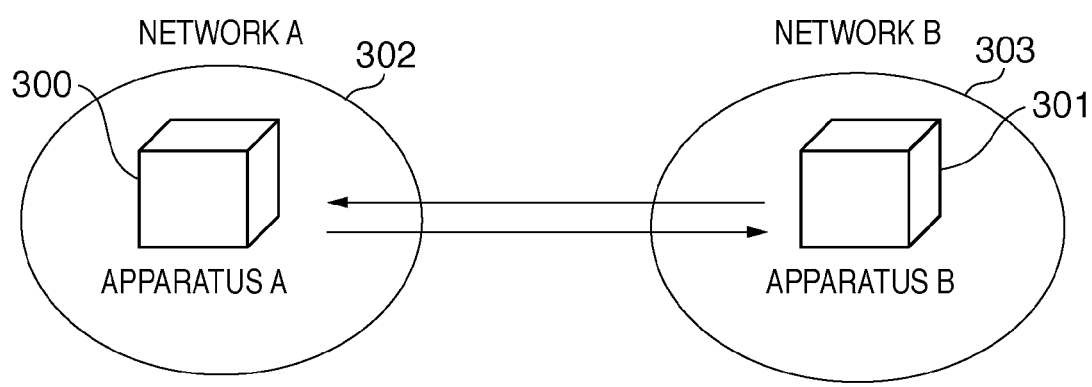
FIG. 3 is a view showing the first network configuration according to the embodiment of the present invention.

FIG. 3 is a view showing a communication apparatus A 300 (to be referred to as apparatus A hereinafter) and a communication apparatus B 301 (to be referred to as apparatus B hereinafter). Those apparatuses have the arrangements of FIGS. 1 and 2 described above.

Neither of the apparatuses A and B have been determined to serve as a communication parameter provider or receiver. The apparatus A has created a network A 302 (to be referred to as network A hereinafter), and the apparatus B has created a network B 303 (to be referred to as network B hereinafter).

The apparatuses A and B find each other, and decide which of them becomes a provider. Consequently, an apparatus which becomes a provider provides communication parameters for the other apparatus which becomes a receiver.

Networks A and B are ad hoc networks created by the apparatuses A and B, respectively. An ad hoc network is called an IBSS (Independent Basic Service Set), and each network is discriminated by a BSSID as a network identifier.

Note that a BSSID is a network identifier having a random value generated by an apparatus which creates a network. Note that an SSID is a network identifier which can be preset in an apparatus or can be set to an arbitrary value by the user, and is different from a BSSID. As is apparent from the above description, a BSSID is not a communication parameter provided from a provider to a receiver by executing communication parameter automatic setting processing.

Figure 4:
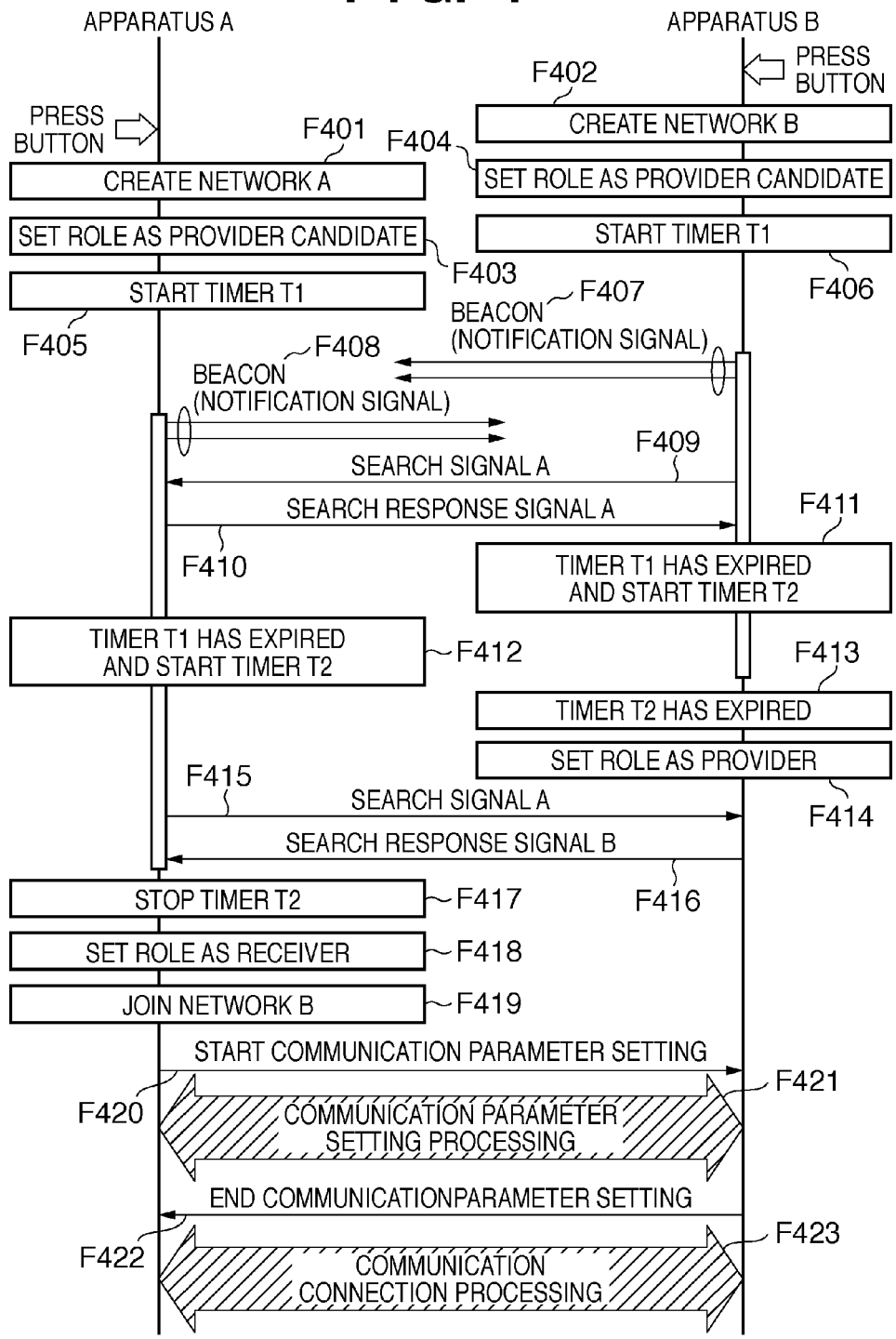
FIG. 4 is a sequence chart showing the operation of apparatuses A and B according to the embodiment of the present invention.

FIG. 4 is a sequence chart showing an example of a processing sequence when communication parameter automatic setting processing is executed between the apparatuses A and B by pressing the setting buttons 106 of apparatuses A and B.

When the setting buttons 106 of apparatuses A and B are pressed, the apparatus A creates a unique network A (F401) and the apparatus B creates unique network B (F402).

The networks created in F401 and F402 are created on a same predetermined wireless LAN channel. A wireless LAN channel is a frequency channel (communication channel) allowed to be used for wireless LAN communication. In the case of a wireless LAN complying with the IEEE802.11g standard, for example, 1ch to 13ch can be used as wireless LAN channels in Japan. Assume that the setting button 106 of apparatus B is pressed first and the apparatus B creates the network first.

The operation role (to be referred to as a role hereinafter) of the apparatus A or B is set to "provider candidate" indicating that the role is not yet determined to be a provider or receiver (F403 or F404). The apparatus A or B starts a first timer T1 (F405 or F406).

In the corresponding created network, the apparatus A or B transmits a beacon (notification signal) containing an information element to notify that it has a communication parameter automatic setting processing function. Alternatively, the apparatus A or B transmits a beacon containing an information element to give notification that the automatic setting processing is in progress (F407 or F408). The beacon can also contain an information element to indicate the current role "provider candidate".

Since the beacons contain the BSSIDs of the networks A and B, which are different from each other, an apparatus which has received the beacon can recognize a network to which an apparatus that has transmitted the beacon belongs.

Subsequently, the apparatus B transmits a search signal A (F409). Like the beacon, the search signal A contains an information element indicating that the apparatus B has the communication parameter automatic setting processing function, or an information element indicating that the automatic setting processing is in progress and that indicating the current role "provider candidate". Note that until the timer T1 expires, the search signal A is transmitted only on the wireless LAN channel on which the network has been created. This allows an apparatus to reliably receive a search response signal from an apparatus existing on the network on the wireless LAN channel until the timer T1 expires.

Upon receiving the search signal A transmitted from the apparatus B, the apparatus A transmits a search response signal A to the apparatus B (F410). Like the beacon or search signal A, the search response signal A contains an information element indicating that the apparatus A has the communication parameter automatic setting processing function, or an information element indicating that the automatic setting processing is in progress and that indicating the current role "provider candidate".

If the apparatus B can detect no provider and then the timer T1 expires (F411), the apparatus B starts a second timer T2 (F411). Likewise, if the apparatus A can detect no provider and then the timer T1 expires (F412), the apparatus A starts a second timer T2 (F412).

Like the timer T1, each apparatus transmits a search signal A until the timer T2 expires. Note that until the timer T2 expires, search signal A is transmitted while switching all wireless LAN channels available for communication. This allows an apparatus to receive search response signals from apparatuses existing on networks on all the wireless LAN channels until the timer T2 expires.

If the apparatus B can detect no provider and then the timer T2 expires (F413), the apparatus B sets its operation role as a provider (F414).

Subsequently, the apparatus A transmits a search signal A (F415). The search signal A transmitted from the apparatus A contains an information element indicating that the apparatus A has the communication parameter automatic setting processing function, or an information element indicating that the automatic setting processing is in progress and that indicating the current role "provider candidate".

Upon receiving the search signal A transmitted from the apparatus A, the apparatus B transmits a search response signal B to the apparatus A (F416). Like the beacon or search signal A, the search response signal B contains an information element indicating that the apparatus B has the communication parameter automatic setting processing function, or an information element indicating that the automatic setting processing is in progress and that indicating the current role. Since the operational role of the apparatus B has been decided to be a provider at this time, the search response signal B contains an information element indicating "provider". In addition to the information element indicating "provider" as a role, the search response signal B may be added with an information element indicating that the apparatus B can provide communication parameters.

Upon receiving the search response signal B transmitted from the apparatus B, the apparatus A confirms that the role of the apparatus B is a provider and the apparatus B can provide communication parameters. Then, the apparatus A stops the timer T2 (F417), sets its role as a receiver (F418), and joins the network B created by the apparatus B (F419). This processing allows transmission/reception, between the apparatuses A and B, communication messages (protocol messages) exchanged in communication parameter automatic setting protocol processing.

Note that the automatic setting protocol processing transmits/receives various predetermined communication messages to provide communication parameters from a provider to a receiver. In WPS, the protocol processing is called a registration protocol (see non-patent reference 1). For descriptive convenience, in this embodiment, assume that the receiver transmits a message indicating the start of communication parameter setting to the provider, and the provider performs communication parameter providing processing for the receiver in response to the message. Assume also that upon completion of the providing processing, the provider transmits a communication parameter setting end message.

When the apparatus A joins the network B in F417, communication parameters such as an encryption key and authentication key are not set in apparatus A yet. It is, therefore, impossible to perform communication using encryption and authentication between the apparatuses A and B.

To decide the roles of communication parameter provider and receiver between the apparatuses A and B, the search signals and search response signals are used.

However, it is also possible to decide the roles using the information of the mutually transmitted/received beacons instead of transmitting/receiving the search signals and search response signals.

When joining the network created by the apparatus B, the apparatus A transmits a message indicating the start of communication parameter setting to the apparatus B (F420), and executes communication parameter providing processing from the apparatus B serving as a provider to the apparatus A serving as a receiver (F421). Upon completion of the communication parameter providing processing, the apparatus B transmits a communication parameter setting end message to the apparatus A (F422). This ends the communication parameter setting processing. The apparatuses A and B thus share the communication parameters.

Consequently, the apparatuses A and B can execute communication connection processing using the shared communication parameters (F423).

By starting the communication connection processing upon completion of the communication parameter setting processing, it is possible to perform communication between the apparatuses A and B without requiring any user operation. In this case, an apparatus may transmit a connection request signal to explicitly indicate that the communication connection processing has started. Unlike an infrastructure mode, no association processing is executed in an ad hoc mode. However, by receiving a connection request signal, it is possible to quickly recognize an apparatus which has made a connection request.

In this embodiment, apparatus B transmits the communication parameters of network B to apparatus A, and communication connection processing is executed using the communication parameters. In this case, by causing apparatus A to transmit a connection request signal to apparatus B, apparatus B can recognize that apparatus A has joined network B, and easily grasp the number of apparatuses belonging to network B.

The user may check whether to start the communication connection processing before it starts, and the communication connection processing may start in response to a user operation. For example, upon completion of the communication parameter setting processing, the display unit 105 may provide a display to prompt the user to select whether to start the connection processing. In response to a user input from the input unit 109, the communication connection processing may start.

Furthermore, apparatus B may transmit a communication parameter indicating a network different from network B to apparatus A. For example, apparatus B may provide apparatus A with communication parameters for communication in network C. After that, apparatuses A and B may perform communication in network C. In this case, apparatus A or B uses, as a trigger, detection of the other apparatus in network C to start communication connection processing. Note that in this case, network C may be a network on a wireless LAN channel which is different from network B as a matter of course.

Figure 8:
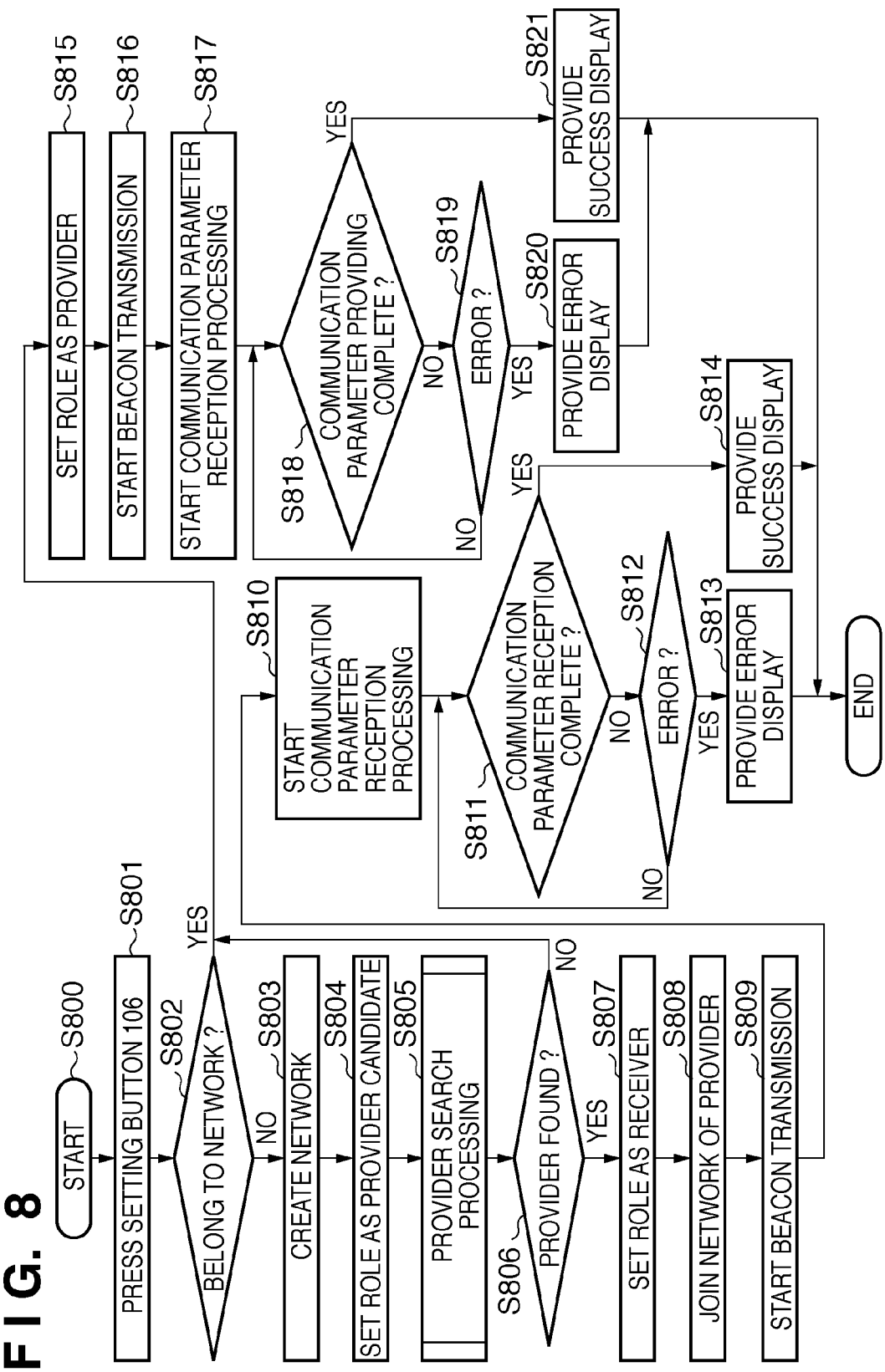
FIG. 8 is a flowchart illustrating a communication parameter automatic setting operation according to the embodiment of the present invention.

FIG. 8 is a flowchart illustrating an example of an operation sequence when the setting buttons 106 of apparatuses A and B are pressed, apparatuses A and B decide to operate as a provider or receiver, and then communication parameter automatic setting processing is executed.

Control executed by apparatus A or B will be explained below based on this flowchart.

The setting button 106 is pressed to instruct to start communication parameter setting processing (step S801).

An apparatus in which the setting button 106 has been pressed checks if the apparatus already belongs to a network (step S802). For example, a case in which the apparatus belongs to a network indicates a case in which the apparatus has already formed the network using communication parameters shared by executing communication parameter setting processing with another apparatus.

If the apparatus already belongs to a network, it sets its role as a provider to allow another new apparatus to join the network (step S815). The apparatus starts to transmit a beacon containing information which indicates that the role of its own is a provider (step S816).

Upon receiving a message indicating the start of communication parameter setting from a new apparatus joining the network, the apparatus starts communication parameter providing processing (step S817).

That is, if the apparatus belongs to the network, it provides the communication parameters of the network in the communication parameter providing processing started in step S817. Note that if the apparatus already belongs to the network, it starts start notification processing shown in FIG. 6 (to be described later).

A beacon (notification signal), search signal (probe request), and search response signal (probe response) mandatorily or optionally contain the following information elements, respectively:

information element to notify that the apparatus has a communication parameter automatic setting processing function or automatic setting processing is in progress;
information element indicating the role of the apparatus; and
information element indicating whether a providing function is active.

If it is determined in step S802 that the apparatus does not belong to any network, the apparatus creates a network to decide its operation role (step S803). The apparatus sets its role as a provider candidate (step S804), and then starts provider search processing (to be described later) (step S805). Assume that the network created in step S803 is created on a predetermined wireless LAN channel.

If, as a result of the provider search processing, the apparatus finds an apparatus serving as a provider (YES in step S806), it sets its role as a receiver (step S807), and joins a network which has been created by the provider (step S808). After joining the network, the apparatus starts to transmit a beacon containing information which indicates that its own role is "receiver" (step S809).

At this time, since the provider has not yet provided communication parameters for the apparatus, the apparatus cannot perform communication using encryption and authentication in the network which it has joined. Upon joining the network, the apparatus transmits a message indicating the start of communication parameter setting to the provider to request to provide communication parameters, and starts communication parameter reception processing from the provider (step S810).

If, as a result of the provider search processing, the apparatus cannot find an apparatus serving as a provider (NO in step S806), it sets its role as a provider (step S815).

Subsequently, the apparatus starts to transmit a beacon containing information which indicates that the apparatus serves as a provider (step S816). Upon receiving a message indicating the start of communication parameter setting from a receiver, the apparatus starts communication parameter providing processing (step S817). If the apparatus does not belong to any network, it provides the communication parameters of the network created in step S803 in the communication parameter providing processing started in step S817.

The apparatus serving as a receiver checks whether reception of the communication parameters is complete (step S811). If reception of the communication parameters is complete, the display unit 105 provides a display to the user to indicate that the communication parameter setting processing has succeeded by way of a message on an LCD, flickering, lighting, and color of an LED, or a sound (step S814). Then, the process ends (step S822).

If an error occurs (step S812), the process advances to step S813. The display unit 105 makes an error notification to the user by way of a message on the LCD, flickering, lighting, and color of the LED, or a sound (step S813). Then, the process ends (step S822).

The apparatus serving as a provider checks whether the communication parameter providing processing is complete (step S818). If the communication parameter providing processing is complete, the process advances to step S821. The display unit 105 provides a display to the user to indicate that the communication parameter setting processing has succeeded by way of a message on the LCD, flickering, lighting, and color of the LED, or a sound (step S821). Then, the process ends (step S822). On the other hand, if an error occurs (step S819), the process advances to step S820. The display unit 105 makes an error notification to the user by way of a message on the LCD, flickering, lighting, and color of the LED, or a sound (step S820). Then, the process ends (step S822).

FIG. 17 is a flowchart illustrating an example of an operation sequence when the provider search processing (a search control step) executed in step S805 of FIG. 8 is performed.

Control of the provider search processing will be described below based on this flowchart.

When the processing starts, the apparatus starts a first timer T1 (step S1700).

Upon start of the timer T1, the apparatus starts beacon transmission (step S1701). Note that a beacon may contain an information element indicating the current role "provider candidate".

Until the apparatus finds a provider or the timer T1 expires, the apparatus executes provider search processing (steps S1702 to S1705). More specifically, if the timer T1 has not expired (step S1702), the apparatus transmits a search signal (probe request) (step S1703), and stands by for reception of a search response signal (probe response) (step S1704).

In this embodiment, transmission of a search signal in step S1703 and reception of a search response signal in step S1704 are performed only on a predetermined wireless LAN channel (communication channel). That is, a plurality of apparatuses which execute communication parameter setting processing form a network on the predetermined wireless LAN channel, and search for a provider on the wireless LAN channel until a first period elapses (a first search means). This makes it possible to quickly find a provider, if the provider forms a network on the predetermined wireless LAN channel.

Next, the apparatus determines whether the role of a partner apparatus contained in an information element of the received search response signal is a provider (step S1705). If the role of the partner apparatus is a provider, the apparatus stops the timer T1 (step S1711), and ends the process.

If the apparatus cannot find an apparatus serving as a provider before the timer T1 expires (step S1702), the apparatus starts a second timer T2 (step S1706).

Upon start of the timer T2, the apparatus executes provider search processing until the apparatus finds a provider or the timer T2 expires (steps S1707 to S1710). More specifically, if the timer T2 has not expired (step S1707), the apparatus transmits a search signal (probe request) (step S1708), and stands by for reception of a search response signal (probe response) (step S1709).

In this embodiment, transmission of a search signal in step S1708 and reception of a search response signal in step S1709 are performed on all wireless LAN channels available for communication. This can be performed by, for example, switching transmission of a search signal and reception of a search response signal on the wireless LAN channels.

That is, if the apparatus cannot detect a provider on the predetermined wireless LAN channel before the first period elapses, provider search processing is executed until a second period elapses, while sequentially switching the wireless LAN channels (a second search means).

This makes it possible to reliably find a provider, even if an apparatus belonging to a network different from that on the predetermined wireless LAN channel becomes a provider (YES in step S802), and then provides communication parameters on the network.

Then, the apparatus determines whether the role of the partner apparatus contained in an information element of the received search response signal is a provider (step S1710). If the role of the partner apparatus is a provider, the apparatus stops the timer T2 (step S1712), and ends the process.

If the apparatus cannot find an apparatus serving as a provider before the timer T2 expires (step S1707), it ends the process.

The method (active scan) of searching for a provider, which has started the communication parameter setting processing, by standing by for reception of a probe response to a probe request has been explained with reference to FIG. 17. The provider which is executing the communication parameter setting processing transmits a beacon added with additional information indicating communication parameter automatic setting. Therefore, a method (passive scan) in which the receiver stands by for reception of the beacon for a certain period of time may be used.

The method of determining whether the role of the partner apparatus contained in an information element of the received search response signal is "provider" has been explained in steps S1705 and S1710. If the role of the partner apparatus contained in the information element of the received search response signal is "provider candidate", the apparatus may determine whether to decide its own role as a provider using information contained in the search response signal. More specifically, for example, the apparatus which transmits a search response signal stores, in the search response signal, an elapsed time from when the setting button 106 is pressed, and transmits it. The apparatus which has received the search response signal compares the elapsed time stored in the search response signal with an elapsed time from when its setting button 106 is pressed. As a result of the comparison, if the setting button 106 of the apparatus has been pressed earlier than that of the apparatus which has transmitted the search response signal, the apparatus sets its role as a provider, and advances the process to step S816.

As a result of the comparison, if the setting button 106 of the apparatus which has transmitted the search response signal has been pressed earlier than that of the apparatus, the apparatus transmits a notification signal to the apparatus which has transmitted the search response signal. Upon receiving the notification signal, the apparatus may set its role as a provider.

The above processing makes it possible to quickly decide a provider.

The information to be compared is not limited to an elapsed time from when the setting button 106 is pressed. For example, the magnitudes of the MAC addresses of the apparatuses may be compared. Alternatively, a TSF (Timing Synchronization Function) value contained in the search response signal may be used as a comparison target.

A case in which an apparatus is newly added to an already existing ad hoc network using communication parameter automatic setting will be explained next. The already existing ad hoc network means an ad hoc network which has been formed from a plurality of apparatuses using communication parameters shared between apparatuses which had executed communication parameter setting processing.

Figure 5:
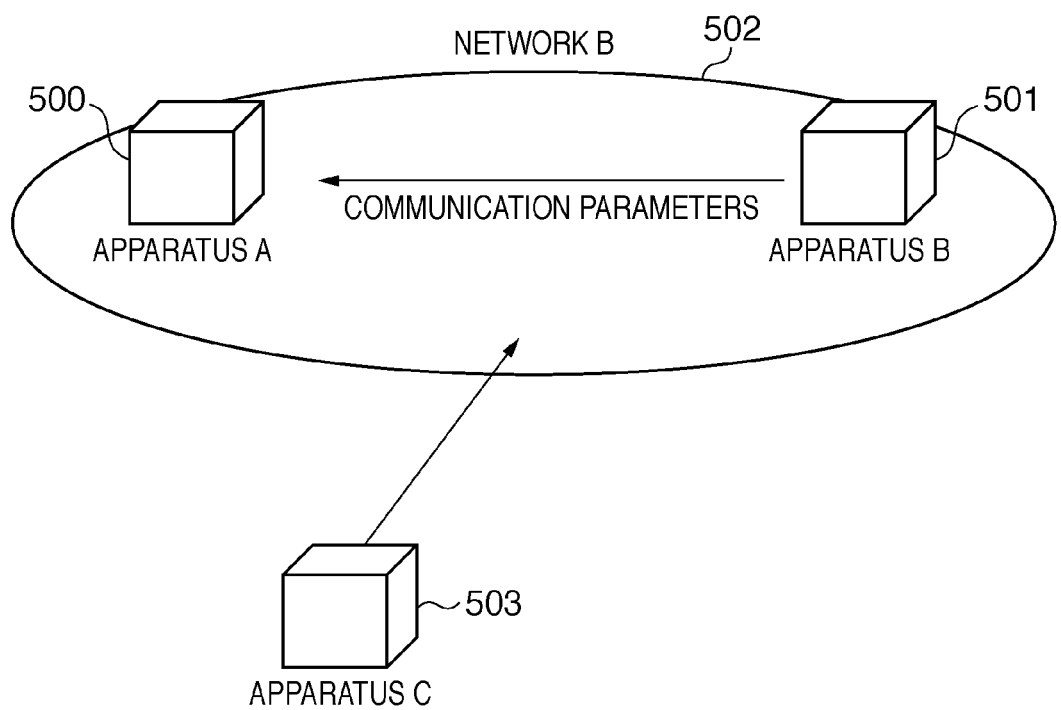
FIG. 5 is a view showing the second network configuration according to the embodiment of the present invention.

FIG. 5 is a view showing a first communication apparatus A 500 (to be referred to as apparatus A hereinafter), a second communication apparatus B 501 (to be referred to as apparatus B hereinafter), a third communication apparatus C 503 (to be referred to as apparatus C hereinafter), and a network 502. Apparatuses A, B, and C have the arrangements of FIGS. 1 and 2 described above.

Consider a case in which the setting buttons of apparatuses B and C are pressed, and apparatus C then joins the network 502 formed from apparatuses A and B.

Figure 6:
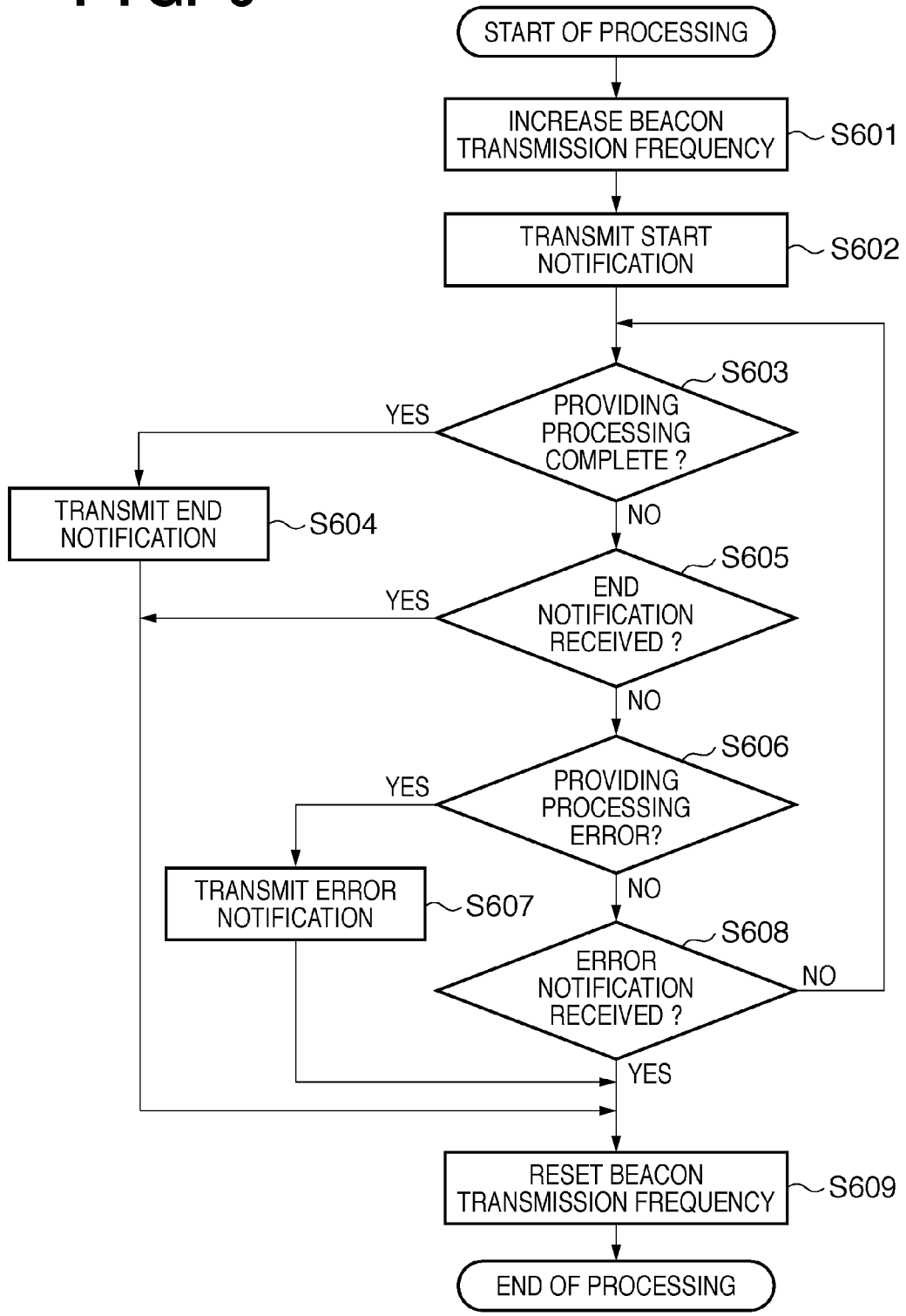
FIG. 6 is a flowchart illustrating the notification processing operation of a provider according to the embodiment of the present invention.

FIG. 6 is a flowchart for explaining a notification processing operation in a provider. If an apparatus belongs to a network in step S802 of FIG. 8, it starts the processing of FIG. 6.

Upon start of the processing, the beacon control unit 213 of the provider increases the beacon transmission frequency (the transmission rate or the number of times of transmission) per unit time by the provider (step S601).

In an IEEE802.11 wireless LAN ad hoc network, it is defined that an apparatus which is to return a probe response is the one that has transmitted a beacon immediately before receiving a probe request.

In step S601, therefore, CW is set to a value smaller than an initial value. This increases the number of times beacons are transmitted per unit time by the provider as compared with another apparatus belonging to the network. Consequently, in provider search processing (steps S808 to S810 in FIG. 8) by an apparatus newly joining the network, it is possible to detect a probe response from the provider within a short time.

As described above, as the beacon transmission frequency of the provider increases, when an apparatus newly joining the network searches for a provider, the probability that a probe response is received from the provider becomes high. Even when an apparatus newly joining the network searches for a provider by the passive scan, the probability that a beacon is received from the provider rises.

This makes it possible to lower the probability that an apparatus newly joining the network cannot detect a provider and then an elapsed time exceeds the time limit of communication parameter setting processing. If the apparatus newly joining the network can detect a provider within a short time, it is possible to shorten a time elapsed until the communication parameter providing processing ends.

After that, the provider broadcasts a start notification message to notify that the communication parameter automatic setting processing has started (step S602). Note that the provider may unicast the start notification message to each apparatus which belongs to the network. In other words, the start notification message is a message to notify that apparatus B has started its operation as a provider.

The provider stands by until the started providing processing abnormally ends (step S606) or the communication parameter providing processing to the receiver ends (step S603). Alternatively, the provider stands by until it receives an end notification message or error notification message from another apparatus (step S605 or S608).

If the providing processing has succeeded and the communication parameter providing processing to the receiver ends (step S603), the provider broadcasts an end notification message (step S604). Note that the provider may unicast the end notification message to each apparatus which belongs to the network.

When the provider transmits the end notification message in step S604, or receives an end notification message from another apparatus (step S605), the process advances to step S609.

If the providing processing has failed (step S606), the provider broadcasts an error notification message (step S607). Note that the provider may unicast the error notification message to each apparatus which belongs to the network.

When the provider transmits the error notification message in step S607, or receives an error notification message from another apparatus (step S608), the process advances to step S609.

In step S609, the beacon control unit 213 of the provider resets CW to the initial value, thereby returning the beacon transmission frequency increased in step S601 to the original value.

As long as the providing processing has started, CW may be reset to the initial value immediately after the processing starts, after the providing processing ends, or after an error occurs. If CW is reset immediately after the processing starts, the beacon transmission frequency (the number of times beacons are transmitted) decreases, thereby more efficiently reducing the power consumption by beacon transmission.

The start notification message transmitted in step S602 is repeatedly transmitted until the providing processing abnormally ends, the provider provides the receiver with communication parameters, or the provider receives a notification message from another apparatus.

Figure 7:
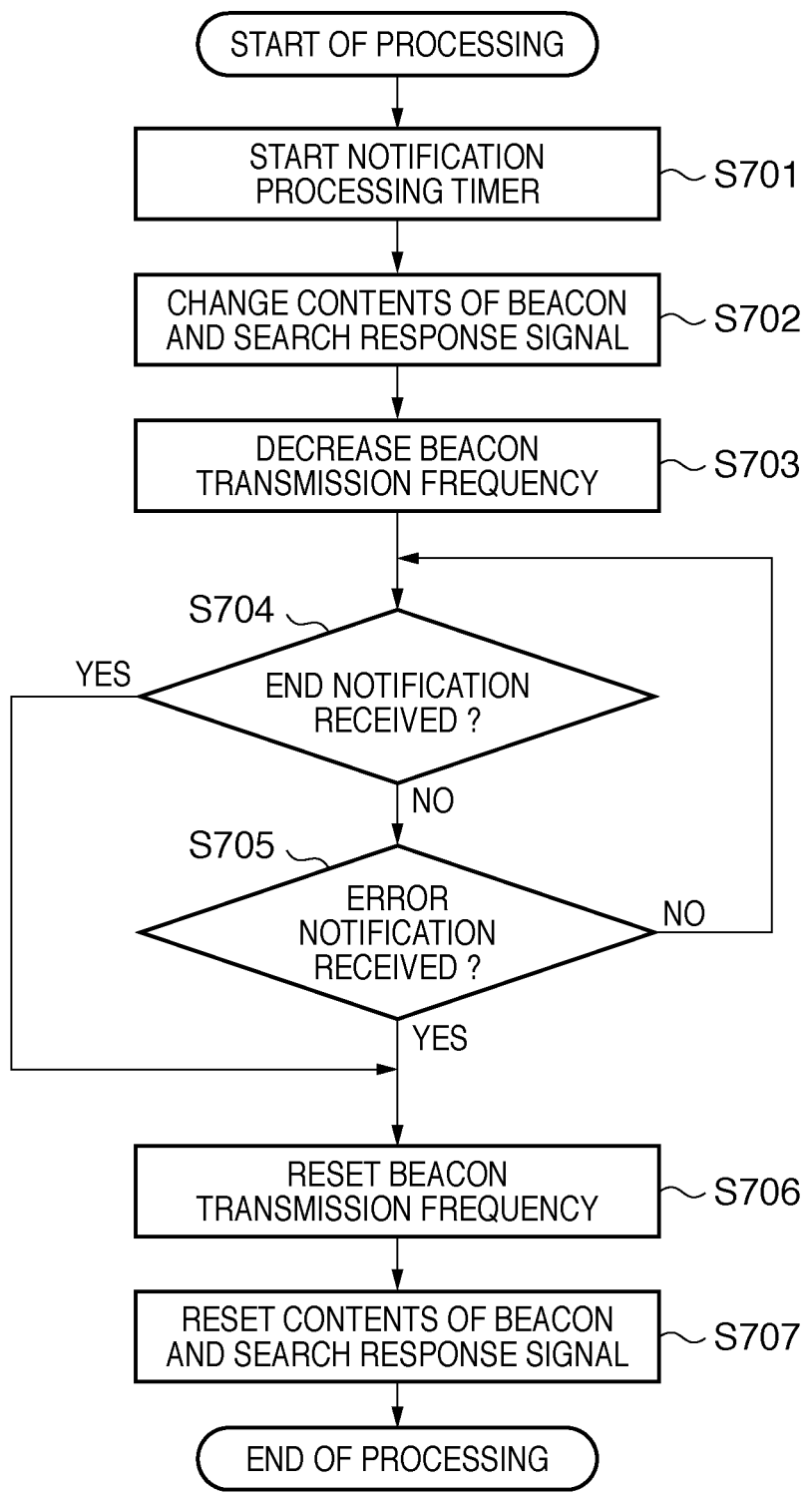
FIG. 7 is a flowchart illustrating a proxy response operation according to the embodiment of the present invention.

FIG. 7 is a flowchart for explaining the proxy response processing operation of each of the apparatuses (apparatus A) which belong to the network except for the provider. Upon receiving the start notification message, the apparatus A starts the processing of FIG. 7.

Upon detecting reception of the start notification message, the automatic setting control unit 208 of apparatus A starts a timer to determine whether an elapsed time exceeds the time limit of processes to be executed in steps S702 to S707 (step S701).

The automatic setting control unit 208 changes the content of information contained in a beacon and search response signal (probe response) to be transmitted (step S702). In step S702, the automatic setting control unit 208 adds identification information for uniquely identifying the provider (apparatus B) to the beacon and search response signal to be transmitted. The unit 208 stores, for example, the MAC address information of the provider as the identification information. This allows an apparatus as the transmission source of a search signal to detect the presence of the provider even when the apparatus A not serving as a provider returns the search response signal in response to the search signal.

The beacon control unit 213 changes CW to a value larger than the initial value and sets it (step S703), thereby decreasing the beacon transmission frequency (transmission rate).

As compared with the provider, this reduces the number of times beacons are transmitted per unit time by each of the apparatuses which belong to the network except for the provider. As a result, in provider search processing (steps S808 to S810 in FIG. 8) executed by an apparatus newly joining the network, it is possible to detect a probe response from the provider within a short time.

After that, the apparatus A stands by for an end notification message or error notification message transmitted by the provider (steps S704 and S705). Upon receiving a notification message, the beacon control unit 213 of the apparatus A resets (returns) CW to the initial value, and returns the beacon transmission frequency decreased in step S703 to the original value (step S706).

Furthermore, the automatic setting control unit 208 returns the content of the information contained in the beacon and search response signal to be transmitted to that before change in step S702 (step S707). That is, the unit 208 deletes the identification information for uniquely identifying the provider (apparatus B) added to the beacon and search response signal to be transmitted.

If the timer set in step S701 has expired, the receiver aborts the processes in steps S702 to S707. Note that if the processes in steps S702 and S703 have already executed at the time of the expiration of the timer, resetting processes like in steps S706 and S707 are performed.

Figure 9:
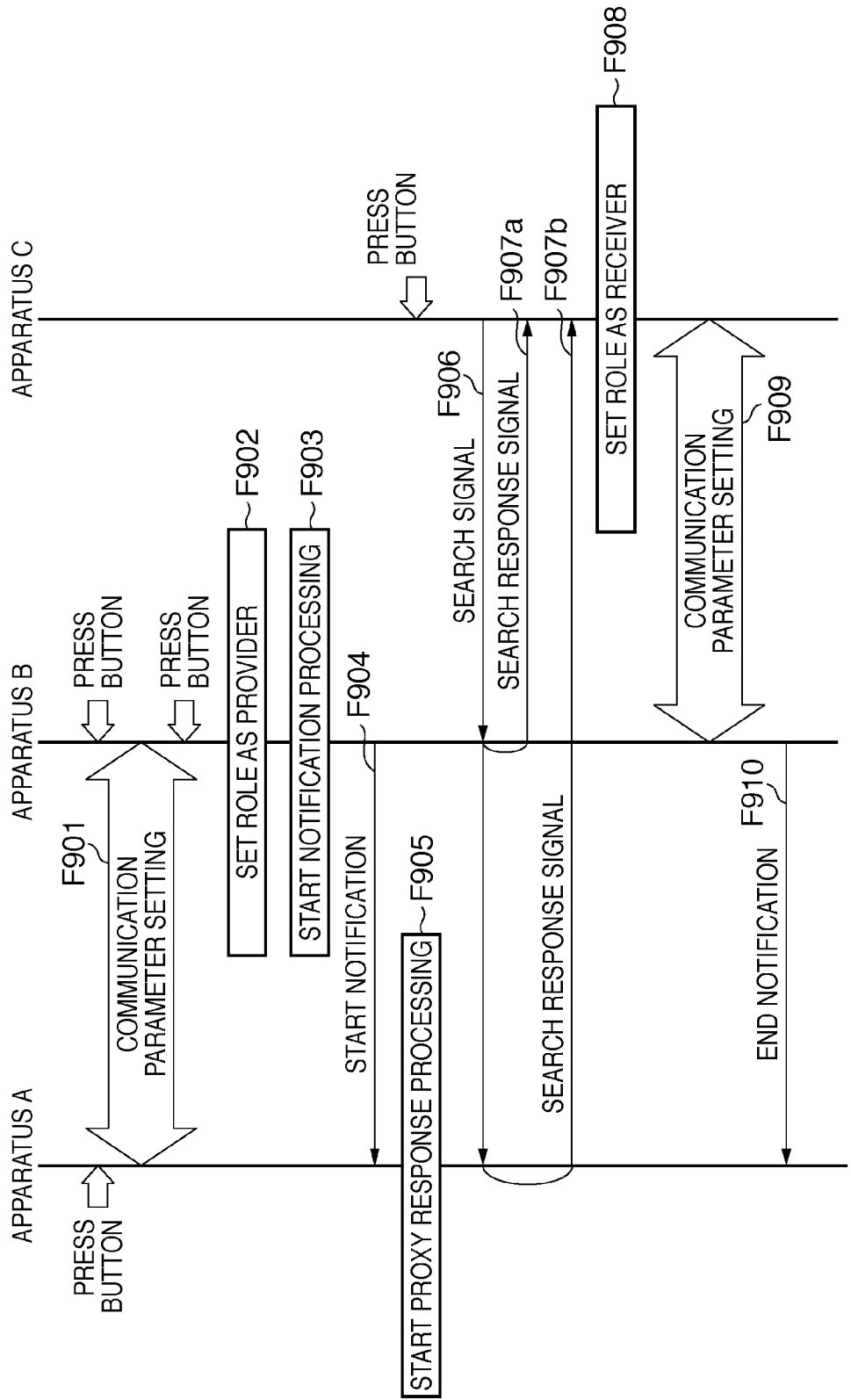
FIG. 9 is a sequence chart showing the operation of apparatuses A, B, and C according to the embodiment of the present invention.

FIG. 9 is a sequence chart for explaining the operation of each apparatus in this embodiment. The apparatus A has received communication parameters from the apparatus B by executing communication parameter automatic setting, and already belongs to the network 502 with the communication parameters (F901). The apparatus C has not received communication parameters yet.

If the user operates the setting button of the apparatus B, the apparatus B starts the processing of FIG. 8 (F902). The apparatus B had already joined the network 502 by using the communication parameters which have been shared with the apparatus A by executing the communication parameter automatic setting. Thus, the apparatus B sets its role as a provider, and starts communication parameter providing processing (F902).

The apparatus B starts the start notification processing of FIG. 6 (F903). After the start notification processing starts, the apparatus B transmits a start notification message, and increases the beacon transmission frequency (F904).

Upon receiving the start notification message, the apparatus A starts the proxy response processing of FIG. 7, and decreases the beacon transmission frequency (F905).

When the apparatus B increases the beacon transmission frequency and the apparatus A decreases the beacon transmission frequency as described above, the apparatus C newly joining the network can detect the apparatus B serving as a provider within a shorter time.

When the user operates the setting button 106 of the apparatus C, the apparatus C starts the processing of FIG. 8. Since the apparatus C does not belong to any network, it performs processing such as creation of a network and setting of its role as a provider candidate, and then starts provider search processing. Note that FIG. 9 shows the search processing and subsequent processing, and processing before the search processing is omitted in FIG. 9. The apparatus C transmits a search signal to detect a provider (F906).

In response to the search signal transmitted from the apparatus C, the apparatus A or B in the network 502 returns a search response signal (F907a or F907b).

In this case, as explained with reference to FIG. 17, the apparatus C searches for a provider on a predetermined wireless LAN channel until a timer T1 expires (steps S1702 to S1705). If, therefore, the network 502 is a network on the predetermined wireless LAN channel, the apparatus C can detect a provider before the timer T1 expires.

The apparatus A may receive, from the apparatus B, the communication parameters of a network on a wireless LAN channel different from the predetermined one by communication parameter automatic setting. That is, this occurs when the network 502 is a network on a wireless LAN channel different from the predetermined one. In this case, after the timer T1 expires, the apparatus C searches for a provider while sequentially switching the wireless LAN channels until a timer T2 expires (steps S1707 to S1710), thereby detecting a provider before the timer T2 expires.

The apparatus A returns a search response signal containing identification information (an MAC address) of the apparatus B serving as a provider (F907b). The apparatus B returns a search response signal containing information which indicates that the apparatus B itself serves as a provider (F907a). This allows the apparatus C to reliably detect the apparatus B serving as a provider regardless of which apparatus in the network 502 returns a search response signal.

Upon detecting the presence of the provider, the apparatus C sets its role as a receiver (F908). The apparatus C then joins the network 502, and receives communication parameters necessary for communication in the network 502 from the apparatus B serving as a provider (F909).

After providing the communication parameters for the apparatus C, the apparatus B transmits an end notification message to the apparatus A (F910). After that, the apparatus B returns the beacon transmission frequency increased in F903 to the original value. Upon receiving the end notification message, the apparatus A returns the beacon transmission frequency decreased in $F_{905}$ to the original value.

In this manner, the user can cause the apparatus C to automatically join the network 502 only by operating the setting button 106.

A case in which the setting button 106 of the apparatus B is operated has been described with reference to FIG. 9. However, the setting button 106 of the apparatus A may be operated. When the setting button 106 of the apparatus A is operated, the apparatus A becomes a provider after step S802 in FIG. 8, and the apparatus C can join the network 502 in the same manner as in FIG. 9.

The above processing allows communication apparatuses to readily share communication parameters. As described above, when the setting buttons 106 of the apparatuses A and B are operated, the communication connection processing is executed between the apparatuses A and B, thereby forming the network 502.

As described above, the communication connection processing may automatically start after the communication parameter setting processing is completed, or may start when the setting button 106 is pressed again or when the input unit 109 issues a connection command.

The communication connection processing varies depending on, out of the shared communication parameters, communication parameters indicating an authentication method and an encryption method.

In this embodiment, combinations of authentication methods and encryption methods to be adopted are as shown in, for example, FIG. 10.

Open authentication is an authentication method defined as Open System Authentication in the IEEE802.11 standard. See the IEEE802.11 standard for details of the method. Shared authentication is an authentication method defined as Shared Key Authentication in the IEEE802.11 and IEEE802.11i standards, and uses WEP as an encryption method.

WEP is an abbreviation for Wired Equivalent Privacy. See the IEEE802.11 or IEEE802.11i standard for details of WEP. A WPA authentication method, a WPA-PSK authentication method, WPA2 authentication method, and WPA2-PSK authentication method are standards for an encryption method defined by the Wi-Fi alliance. These methods are based on RSNA (Robust Security Network Association) in the IEEE802.11i standard.

TKIP is an abbreviation for Temporal Key Integrity Protocol. CCMP is an abbreviation for CTR with CBC-MAC Protocol, and uses AES as an encryption method. AES is an abbreviation for Advanced Encryption Standard.

See Wi-Fi alliance specifications and test specifications for details of TKIP, CCMP, and AES. The WPA-PSK and WPA2-PSK authentication methods use a pre-shared key. The WPA and WPA2 authentication methods perform user authentication using an additionally provided authentication server, and acquire an encryption key of a communication path from the authentication server. See the IEEE802.11i standard for details of these methods.

A connection processing method varies depending on the authentication method. Currently available authentication methods include six kinds of authentication, that is, the open authentication, shared authentication, WPA authentication, WPA-PSK authentication, WPA2 authentication, and WPA2-PSK authentication, as shown in a table. Out of them, the WPA and WAP2 authentication methods are basically identical. Furthermore, the WPA-PSK and WPA2-PSK authentication methods are basically identical. Regarding the WPA and WPA2 authentication methods identical, and the WPA-PSK and WPA2-PSK authentication methods identical, four authentication methods (open, shared, WPA, and WPA-PSK authentication methods) will be explained below.

In the WPA authentication, an additional authentication server is externally provided, and authentication processing is performed using the authentication server. Therefore, when all communication apparatuses equally operate like in the present invention, the authentication processing becomes cumbersome, and a description thereof will be omitted.

In this embodiment, the open authentication, shared authentication, and WPA-PSK authentication will be explained.

First, the open authentication will be described. In the open authentication, communication apparatuses set communication parameters shared between them by executing communication parameter automatic setting processing, and search for one another to form an IBSS network.

Next, the shared authentication will be explained. Details of the shared authentication are described in the IEEE802.11 and IEEE802.11i specifications, and a description thereof will be omitted. When the shared authentication is performed, a requester and responder must be decided.

In the infrastructure mode, an STA (station) operates as a requester, and an AP (access point) operates as a responder. On the other hand, in the ad hoc mode, no AP exists. To implement the shared key authentication in IBSS, an STA needs to have a responder function and a requester/responder role deciding algorithm.

The requester/responder role deciding algorithm may adopt the same method as that for a supplicant/authenticator role deciding algorithm in the WPA-PSK authentication (to be described later). For example, a communication parameter provider in communication parameter automatic setting processing may become a responder, and a communication parameter receiver may become a requester.

Figure 12:
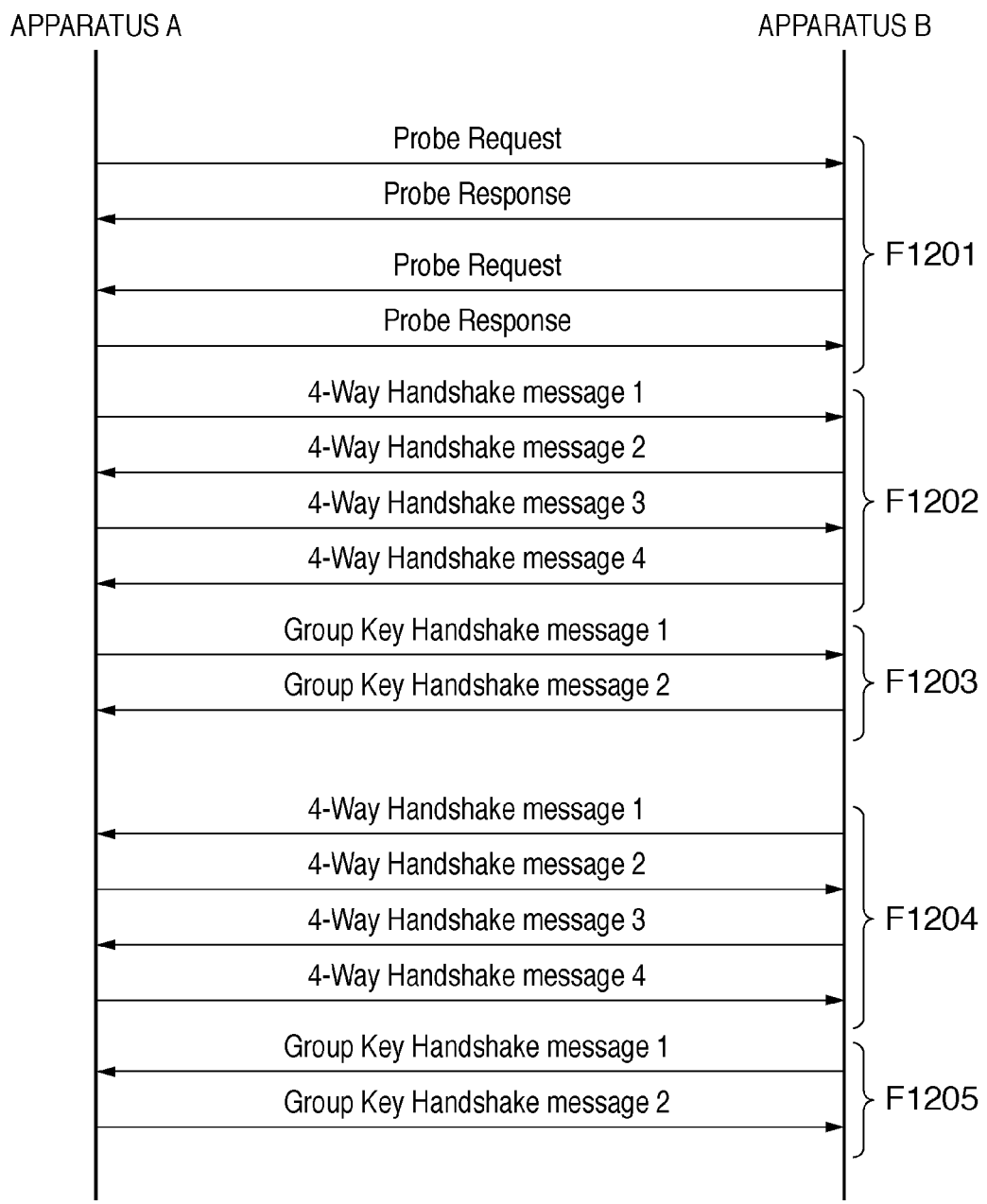
FIG. 12 is a sequence chart of key exchange processing (example 1)

Lastly, the WPA-PSK authentication will be described. The WPA-PSK authentication has been standardized in the IEEE802.11i standard and WPA, and the operation method in IBSS has been defined. FIG. 12 shows the sequence defined in the IEEE802.11i standard. See the IEEE802.11i standard for details of this sequence. An outline will be explained here.

Assume that there exist apparatuses A and B which have completed communication parameter automatic setting processing. Upon completion of the communication parameter automatic setting processing, communication connection processing is automatically executed or is executed in response to a user operation, by using automatically set communication parameters.

Apparatuses A and B search for one another (F1201). When apparatuses A and B recognize each other, an apparatus, out of apparatuses A and B, having a larger MAC address becomes an authenticator, and the other apparatus becomes a supplicant. Apparatuses A and B then execute the four-way handshake and group key handshake for the first time (F1202 and F1203).

The four-way handshake is a mechanism for exchanging random numbers between the authenticator and the supplicant, and generating, for each session, an encryption key for a unicast packet called a pairwise key based on a pre-shared key. The group key handshake is a mechanism for sending an encryption key for a multicast packet or broadcast packet held in the authenticator.

After that, the roles of the authenticator and supplicant are swapped, and the four-way handshake and the group key handshake are performed again (F1204 and F1205). This allows encrypted communication between the apparatuses A and B.

As described above, in the method completely complying with the IEEE802.11i specifications, processing becomes redundant because the four-way handshake and group key handshake are executed several times. It takes a long time to complete connection due to execution of the redundant processing and the role deciding algorithm. It is, therefore, possible to adopt a method for reducing the redundant processing and improving the processing time.

Some methods can be used. In this embodiment, the following four methods will be explained.

First method: The number of times the four-way handshake is executed is reduced to one.

Second method: Group keys are integrated into one group key in a network.

Third method: Group keys and pairwise keys are integrated into one key.

Fourth method: Key exchange is executed in communication parameter automatic setting processing.

FIG. 11 shows differences in number of key exchange sequences, number of held pairwise keys, and number of held group keys between the above four methods.

The number of held keys will be explained. In an ad hoc IBSS network including n communication apparatuses, in the case of the method completely complying with the IEEE802.11i standard, the number of pairwise keys needs to be n−1 corresponding to the number of pairing communication apparatuses. The number of group keys needs to be n+1 in total because it is necessary to hold the number of group keys corresponding to that of the pairing communication apparatuses, a current group key, and an immediately preceding group key. The reason why the two group keys are necessary is because there exists a communication apparatus which has different group keys in transition in the same network depending on the progress of the group key handshake.

In the first method, only the number of sequences is decreased, and the number of held keys remains the same.

In the second method, n−1 pairwise keys are necessary like the above method but only one group key is required for the network.

In the third method, a group key is directly used as a pairwise key. The number of pairwise keys, therefore, becomes zero and only one group key is held.

In the fourth method, n−1 pairwise keys are necessary like the above method. Each communication apparatus in the network may have a group key, or one group key may be held in the entire network. The network, therefore, may have n+1 group keys or only one group key.

The number of times of execution of key exchange for each pairing apparatus will now be described. In the case of the method completely complying with the IEEE802.11i standard, the four-way handshake and the group key handshake are respectively executed twice as already explained with reference to FIG. 12.

In the first method, the redundant four-way handshake is reduced, and the number of times the four-way handshake is executed then becomes one. The group key handshake is performed twice as the above method.

In the second method, the group keys are integrated into one group key in the network. It is, therefore, necessary to always distribute the group key to a new terminal, and the group key handshake is executed only once. As for the number of times the four-way handshake is executed, the four-way handshake may be executed once according to the first method, or may be bilaterally executed twice in conformity with the IEEE802.11i standard.

In the third method, since a preset single key is used as a pairwise key and a group key, no key exchange sequence is performed.

In the fourth method, since key exchange processing is performed in the communication parameter automatic setting processing sequence of WPS, the individual four-way handshake is not executed. The group key handshake is executed any number of times.

As described above with reference to FIG. 11, these methods have the advantage in the number of key exchange sequences and that of held keys as compared with the aforementioned method completely complying with the IEEE802.11i specifications.

Furthermore, the above-described four methods will be explained in detail with reference to sequence charts.

Figure 13:
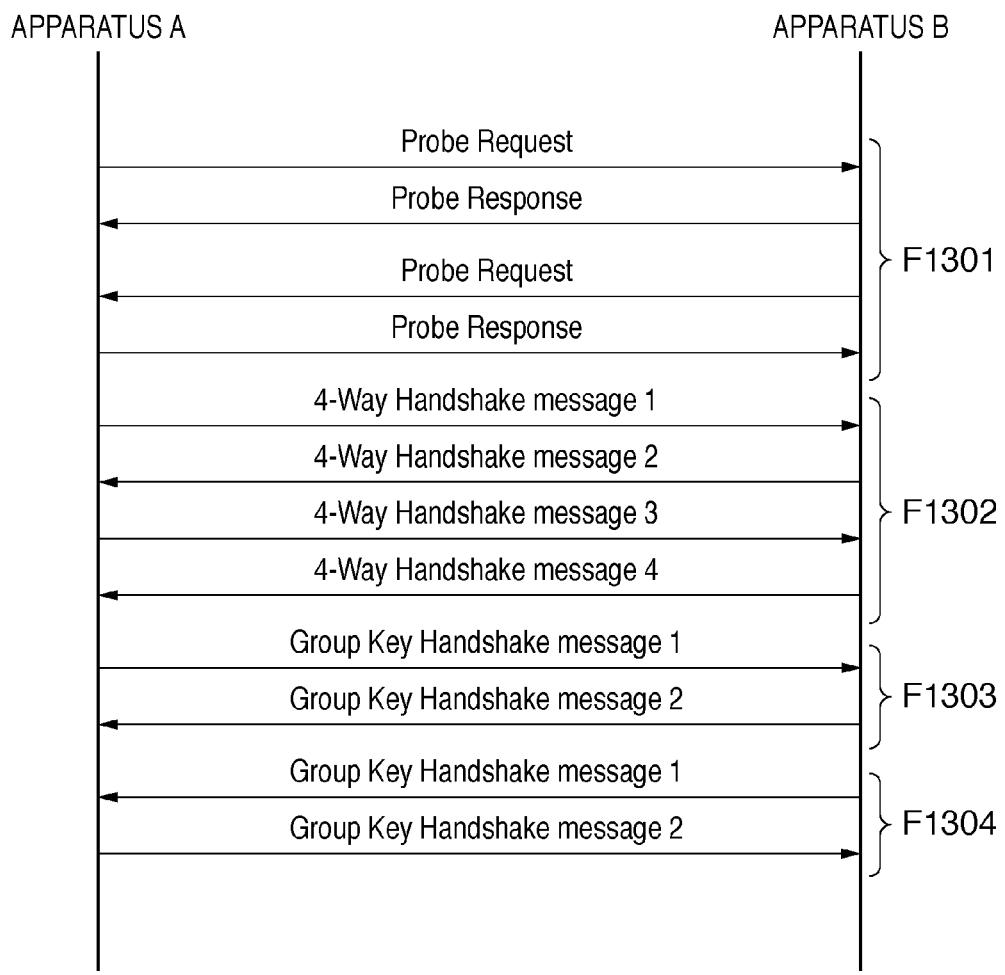
FIG. 13 is a sequence chart of key exchange processing (example 2)

The first method will be described with reference to FIG. 13.

Assume that there exist apparatuses A and B which have completed communication parameter automatic setting processing. Upon completion of the communication parameter automatic setting processing, communication connection processing is automatically executed or is executed in response to a user operation, by using automatically set communication parameters.

The apparatuses A and B search for one another (F1301). When the apparatuses A and B recognize each other, an apparatus, out of the apparatuses A and B, having a larger MAC address becomes an authenticator, and the other apparatus becomes a supplicant. The apparatuses A and B then execute the four-way handshake (F1302), and also execute the group key handshake for the first time (F1303).

After that, the roles of the authenticator and supplicant are swapped, and the group key handshake is performed again (F1304), thereby allowing communication.

According to the IEEE802.11i specifications, the four-way handshake is executed twice for a pair of apparatuses. As described above, however, the first method reduces the number of times the four-way handshake is executed to one.

The four-way handshake is processing for sharing a pairwise key between communication apparatuses which are executing the four-way handshake. Therefore, successively executing the four-way handshake twice does not increase the security level, and is just redundant. The first method, therefore, can shorten a time taken to execute ordinary connection processing by decreasing, to one, the number of times the four-way handshake is executed, which is conventionally executed twice in two ways.

Figure 14:
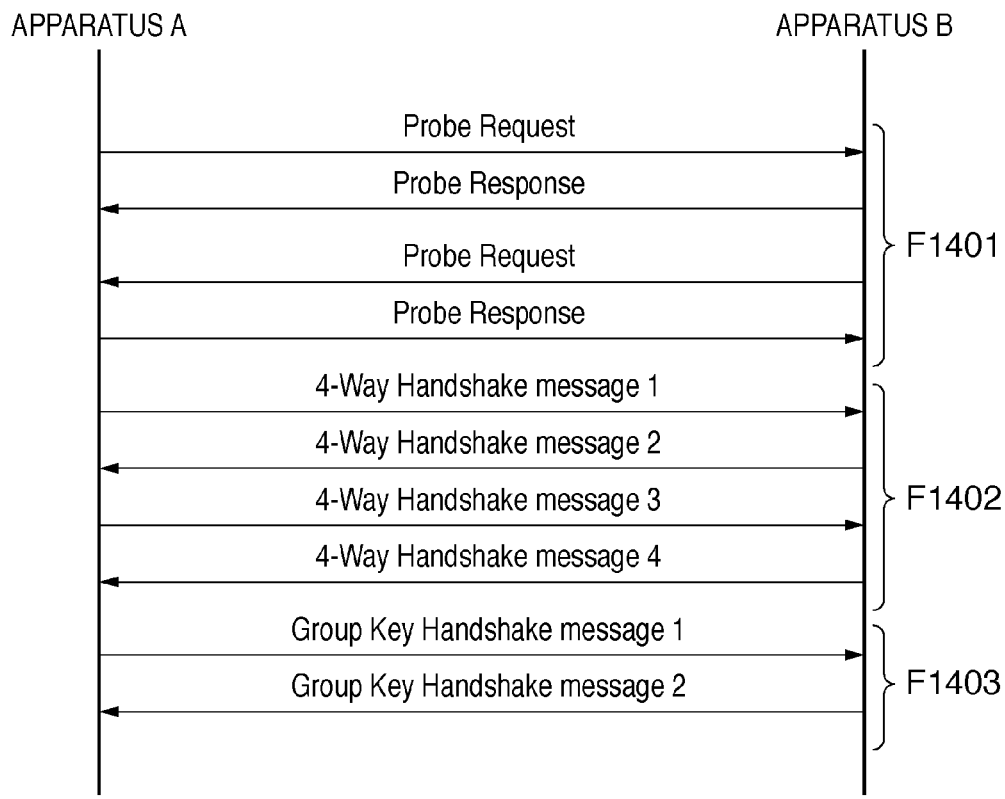
FIG. 14 is a sequence chart of key exchange processing (example 3)

The second method will be described with reference to FIG. 14. Assume that there exist apparatuses A and B which have completed communication parameter automatic setting processing. Upon completion of the communication parameter automatic setting processing, communication connection processing is automatically executed or is executed in response to a user operation, by using automatically set communication parameters.

The apparatuses A and B search for one another (F1401). When the apparatuses A and B can recognize each other, an apparatus, out of the apparatuses A and B, having a larger MAC address becomes an authenticator, and the other apparatus becomes a supplicant. The apparatuses A and B then execute the four-way handshake and the group key handshake (F1402 and F1403), thereby allowing communication.

According to the IEEE802.11i specifications, a different group key is set in each communication apparatus. In the second method, however, the group keys are integrated into one group key in the network.

A pairwise key is prepared for each communication path but one common group key is used in the network. This can decrease, to one, the number of times the group key handshake is executed, which must be executed twice in accordance with the IEEE802.11i standard. Setting only one group key eliminates the need to hold a different key to execute encryption/decryption processing of a broadcast packet and a multicast packet for each apparatus, thereby achieving simplification.

The third method is the same as WPA-None (Optional IBSS Global Pre-shared Key System) described in non-patent reference 2.

Details of WPA-None are described in above-explained non-patent reference 2 and a description thereof will be omitted. In ordinary WPA, the four-way handshake uses a random number to manipulate an element of a pairwise key, thereby generating a session key. On the other hand, in WPA-None, an element of a pairwise key is directly used as a session key.

That is, an important feature of the third method is that no key exchange processing is performed. The security level of this method lowers as compared with ordinary WPA connection processing in which a session key is generated for each connection. This method, however, can raise the security level by activating communication parameter automatic setting processing for each connection, and generating a random communication key for communication parameters shared by the processing every time.

Figure 15:
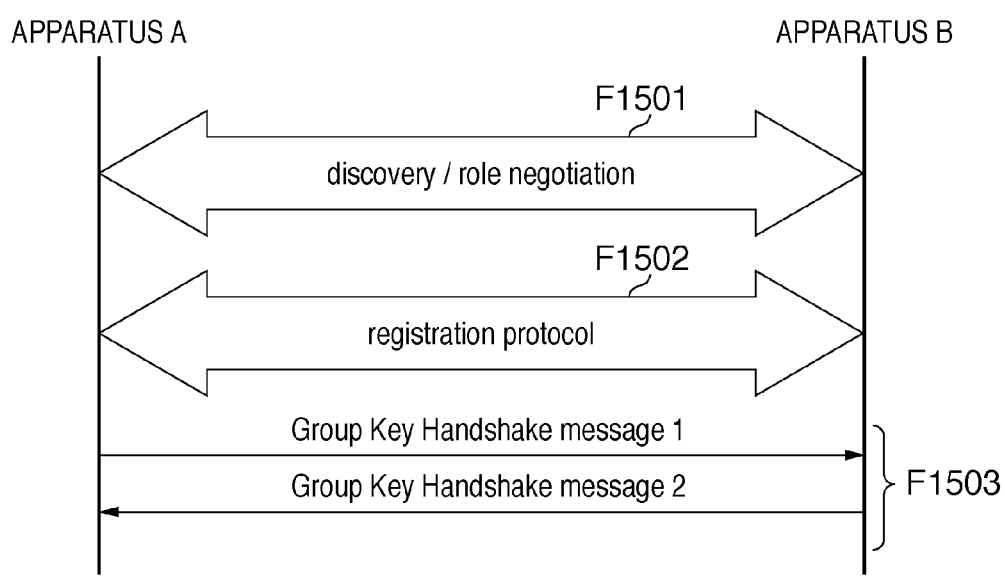
FIG. 15 is a sequence chart of key exchange processing (example 4)

The fourth method will be explained with reference to FIG. 15. First, as described above with reference to FIG. 4, in communication parameter automatic setting processing, communication partner search processing and role deciding processing are performed (F1501). Subsequently, in the communication parameter automatic setting processing, a communication parameter provider transfers communication parameters to a communication parameter receiver (F1502). In this process F1502, key exchange processing which is not conventionally performed is executed simultaneously with the communication parameter setting processing.

To execute the processes at the same time, for example, a random number used for message exchange processing in the communication parameter setting processing is utilized as a random number for the key exchange processing. At the end of the process F1502, the apparatuses A and B share a pairwise key. Upon completion of the communication parameter automatic setting processing, the apparatuses A and B execute group key exchange processing (F1503). As described above, the feature of the fourth method is that the key exchange processing is also executed in the communication parameter automatic setting processing.

According to the fourth method, the security level improves since pairwise keys between apparatuses are different from each other even in the same network. Furthermore, it is possible to shorten a total connection time by executing processing corresponding to the four-way handshake in the communication parameter setting processing.

In this explanation, the group key exchange processing is individually executed. However, it is possible to further shorten the total connection time by executing the group key exchange processing in the communication parameter setting processing.

Among the aforementioned five methods including the method complying with the IEEE802.11i standard, a system may select one method, or may provide a communication parameter containing information indicating a method to be used. Alternatively, a system may dynamically switch the method depending on the mode of communication parameter automatic setting processing.

Figure 16:
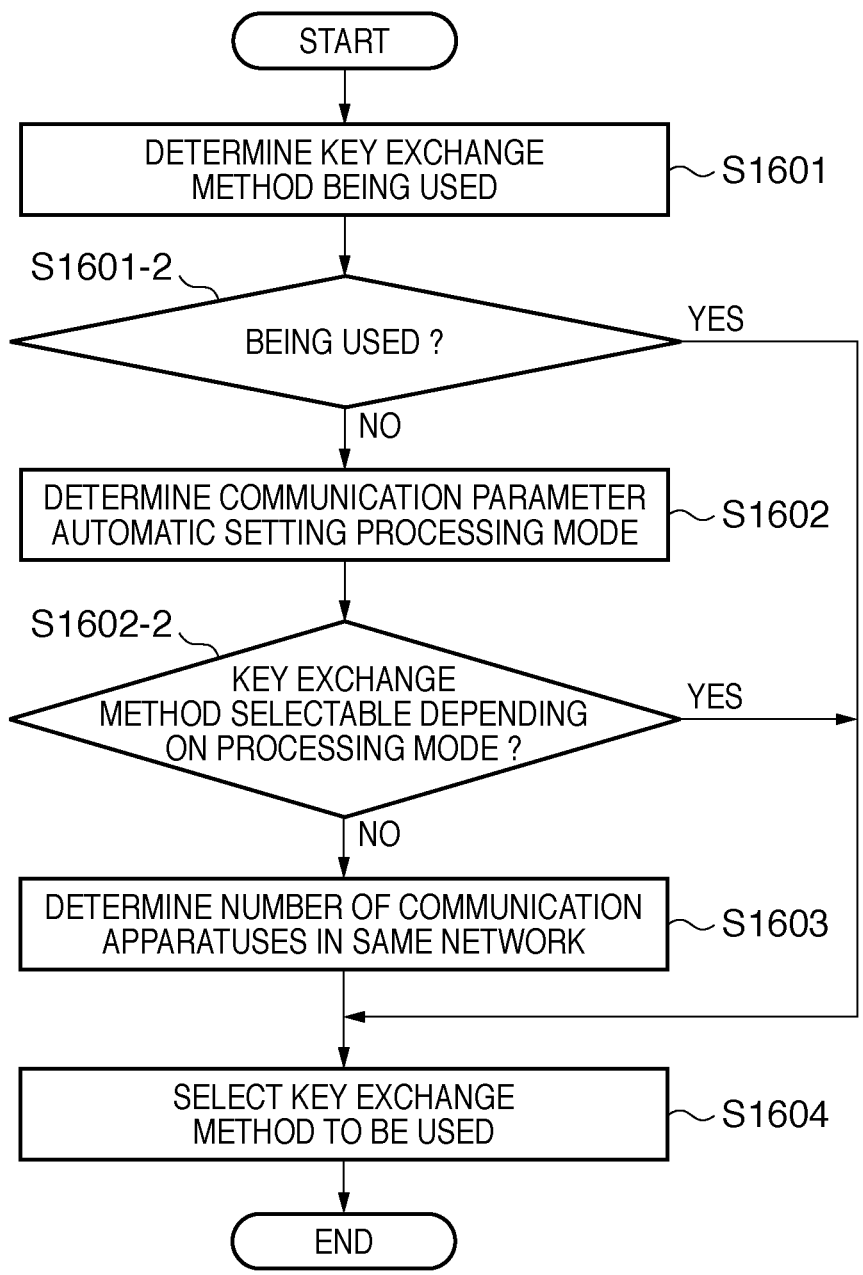
FIG. 16 is a flowchart illustrating a key exchange algorithm selection algorithm.

A case in which the method is dynamically switched depending on the mode of communication parameter automatic setting processing will be explained with reference to FIG. 16.

Assume that WPA-PSK or WPA2-PSK is selected, which needs to exchange a key as a communication parameter by communication parameter automatic setting processing. In this case, a key exchange method already used in a network is determined (step S1601). If it is determined in this determination process that a given key exchange method is already selected (YES in step S1601-2), that method is directly used. If no method is particularly selected (NO in step S1601-2), the processing mode of the communication parameter automatic setting processing is determined next (step S1602).

This processing mode includes a processing mode in which communication parameters set by the communication parameter automatic setting processing are permanently used, and that in which the set communication parameters are used as temporary session information.

For example, in the processing mode in which the set communication parameters are permanently used (a mode in which the same communication parameters are used when wireless communication is performed again after turning off the power), a method (e.g., the first or fourth method) with higher security level is selected.

In the mode in which the set communication parameters are used as temporary session information (a mode in which the set communication parameters are deleted or disabled after turning off the power), a method (e.g., the second or third method) which prioritizes the processing load over the security level may be selected.

If a key exchange method to be used is not determined according to the processing mode (NO in step S1602-2), the number of communication apparatuses existing in the same network is determined next (step S1603). A preferred key exchange method is selected depending on the number of communication apparatuses. If there exist two communication apparatuses, a method completely complying with the IEEE802.11i standard, or the first or fourth method may be selected. If there exist three or more communication apparatuses, the second or third method may be selected.

According to this embodiment, when the setting button of an apparatus belonging to a network is operated, this apparatus becomes a provider to execute communication parameter providing processing. The user can, therefore, receive communication parameters by selecting an arbitrary apparatus with no regard to a provider or receiver among apparatuses belonging to the network.

That is, an apparatus can be newly added to the network by operating the setting button of an arbitrary apparatus without selecting a provider. Furthermore, it is possible to reduce the power consumption by beacon transmission by returning the increased beacon transmission frequency to the original value after the providing processing ends. Note that it is possible to more efficiently lower the power consumption by beacon transmission by returning the beacon transmission frequency to the original value immediately after the communication parameter providing processing starts.

When an apparatus is newly added to a network after easily and securely providing communication parameters, the range of key exchange algorithm options is widened, and a key exchange algorithm is automatically determined and set. This can reduce user stress in forming a network. It is thus possible to securely and readily form a network within a short time.

[Second Embodiment]

In the first embodiment, in the provider search processing described with reference to FIG. 17, an apparatus searches for a provider on a predetermined wireless LAN channel until a timer T1 expires. If the apparatus cannot find a provider and then the timer T1 expires, the apparatus searches for a provider while switching a plurality of wireless LAN channels until a timer T2 expires.

In contrast to this, in the second embodiment, an apparatus searches for a provider while switching all wireless LAN channels until a timer T1 expires. If the apparatus cannot find a provider and then the timer T1 expires, the apparatus searches for a provider on a predetermined wireless LAN channel until a timer T2 expires.

This makes it possible to quickly find a provider, even if an apparatus belonging to a network becomes a provider (YES in step S802) to make communication on a wireless LAN channel different from the predetermined one.

Figure 18:
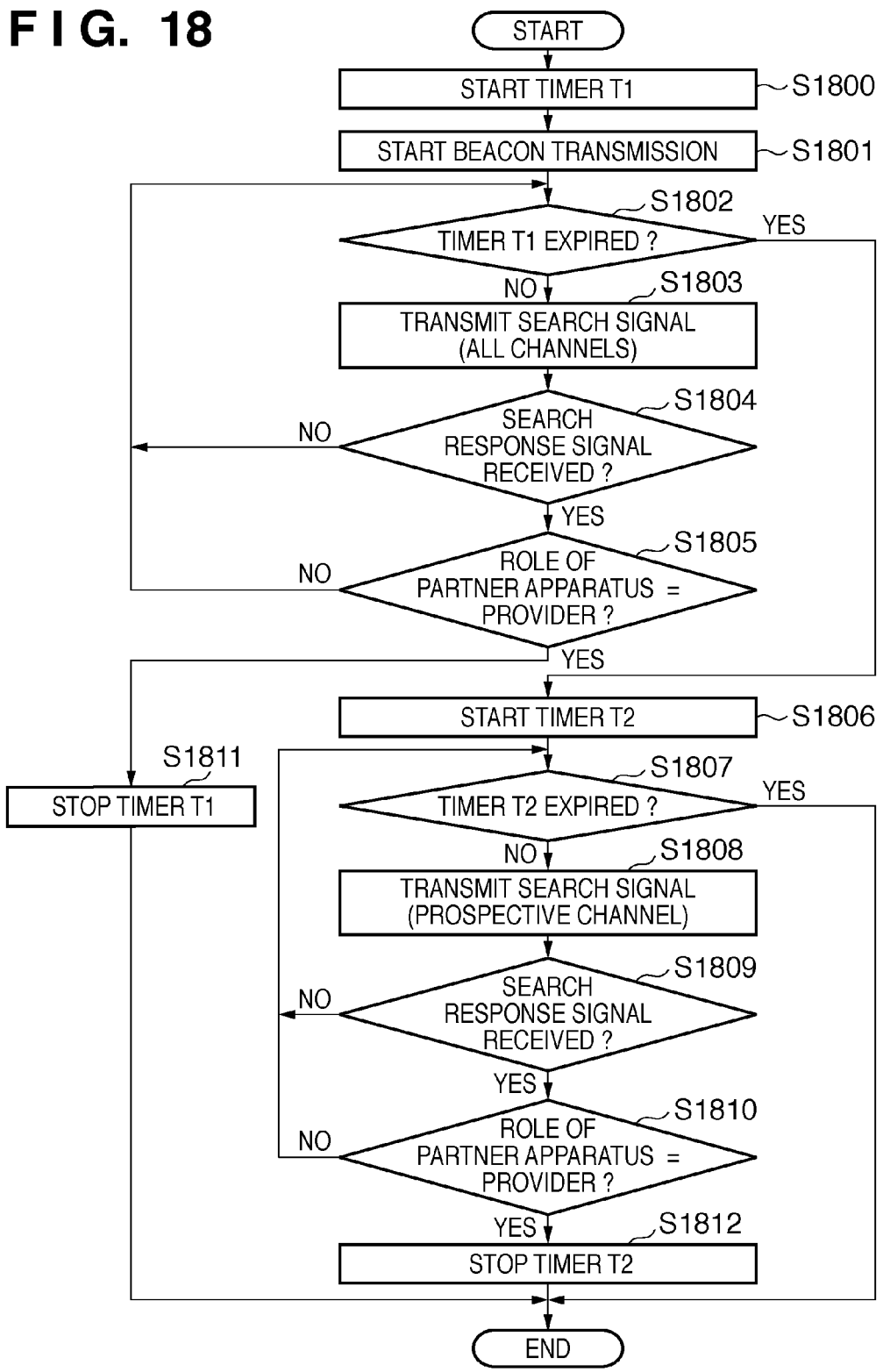
FIG. 18 is a flowchart illustrating a provider search processing operation according to the second embodiment of the present invention.

FIG. 18 is a flowchart illustrating an example of the operation sequence of provider search processing executed in the second embodiment.

Control of the provider search processing will be explained based on this flowchart.

After the processing starts, an apparatus starts a first timer T1 (step S1800).

After starting the timer T1, the apparatus starts beacon transmission (step S1801). Note that a beacon may contain an information element indicating the current role "provider candidate".

The apparatus executes the provider search processing until it finds a provider or the timer T1 expires (steps S1802 to S1805). More specifically, if the timer T1 has not expired (step S1802), the apparatus transmits a search signal (probe request) (step S1803), and stands by for reception of a search response signal (probe response) (step S1804).

In this embodiment, transmission of a search signal in step S1803 and reception of a search response signal in step S1804 are performed on all wireless LAN channels available for communication. This is done by subsequently performing transmission of a search signal and reception of a search response signal on the wireless channels.

This makes it possible to reliably find a provider, even if an apparatus belonging to a network different from that on a predetermined wireless LAN channel becomes a provider (YES in step S802) to provide communication parameters on the network. That is, when apparatus C joins the network 502 in FIG. 5, it can quickly find a provider even if the network 502 is a network on a wireless LAN channel different from the predetermined one.

The apparatus determines whether the role of a partner apparatus contained in an information element of the received search response signal is a provider (step S1805). If the role is a provider, the apparatus stops the timer T1 (step S1811), and ends the process.

If the apparatus cannot find an apparatus serving as a provider before the timer T1 expires (step S1802), it starts a second timer T2 (step S1806).

After starting the timer T2, the apparatus executes provider search processing until it finds a provider or the timer T2 expires (steps S1807 to S1810). More specifically, if the timer T2 has not expired (step S1807), the apparatus transmits a search signal (probe request) (step S1808), and stands by for reception of a search response signal (probe response) (step S1809).

In this embodiment, transmission of a search signal in step S1808 and reception of a search response signal in step S1809 are performed only on the predetermined wireless LAN channel. This allows the apparatus to reliably find a provider even if the provider has built a network on the predetermined wireless LAN channel.

Next, the apparatus determines whether the role of a partner apparatus contained in an information element of the received search response signal is a provider (step S1810). If the role is a provider, the apparatus stops the timer T2 (step S1812), and ends the process.

If the apparatus cannot find an apparatus serving as a provider before the timer T2 expires (step S1807), it ends the process.

The preferred embodiments of the present invention have been described above. These, however, are merely examples for explaining the present invention, and are not intended to limit the scope of the present invention. Various modifications can be made to the embodiments without departing from the spirit or scope of the present invention.

In each embodiment mentioned above, a case has been described in which the value of CW is changed to increase the number of times beacons are transmitted per unit time by a provider as compared with another apparatus. Another parameter may be used as long as a provider can increase the number of times beacons are transmitted as compared with another apparatus. For example, if the transmission interval of a beacon (beacon period) can be changed, it is possible to raise the number of times beacons are transmitted per unit time by reducing the transmission interval of a beacon in a provider.

In the above explanation, CW is changed to be larger or smaller than the initial value. The initial values of CWs of apparatuses are not always equal to each other. Therefore, CW is changed to the minimum value (CWmin) or the maximum value (CWmax) of a change range, thereby reliably changing the beacon transmission frequency (the number of times beacons are transmitted). Furthermore, the above explanation is given with regarding the start notification message as a message to notify that communication parameter automatic setting processing has started.

The start notification message may be a message to notify that the setting button 106 has been operated, and a message for allowing a provider to provide communication parameters for another receiver.

A wireless LAN complying with the IEEE802.11 standard has been explained above as an example. The present invention, however, may be implemented in another wireless medium such as wireless USB, MBOA, Bluetooth®, UWB, or ZigBee. The present invention may also be implemented in a wired communication medium such as a wired LAN.

Note that MBOA is an abbreviation for Multi Band OFDM Alliance. UWB includes wireless USB, wireless 1394, and WINET.

Although a network identifier, encryption method, encryption key, authentication method, and authentication key are used as examples of communication parameters, another information may be used and also included in communication parameters.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2008-259998 filed on Oct. 6, 2008, which is hereby incorporated by reference herein in its entirety.

The invention claimed is:

1. A communication apparatus comprising a computer configured to:
   execute, in a switched manner, a first search process for searching another communication apparatus on a plurality of communication channels and a second search process for searching another communication apparatus by sending, on a specified part of the plurality of communication channels, a probe request that contains an information element indicating that the communication apparatus has a communication parameter automatic setting processing function;
   decide a role of the communication apparatus during the communication parameter automatic setting processing performed between the communication apparatus and a searched another communication apparatus; and
   provide, if the decided role is a role as a provider for providing a communication parameter for wireless network, the communication parameter to the searched another communication apparatus, wherein the communication parameter is a parameter necessary for wireless communication, which includes at least one of SSID, an encryption method, an encryption key, an authentication method, and an authentication key.

2. The apparatus according to claim 1, wherein the computer is further configured to switch from the second search process to the first search process.

3. The apparatus according to claim 1, wherein the computer is further configured to switch from the first search process to the second search process.

4. The apparatus according to claim 1, wherein the computer is further configured to decide the role of the communication apparatus as a role of a receiver for receiving the communication parameter from a provider which provides the communication parameter, in a case where the provider is searched.

5. The apparatus according to claim 1, wherein the computer is further configured to, in a case the searched another communication apparatus has not been determined to serve as a provider for providing a communication parameter or a receiver for receiving a communication parameter from the provider, compare information sent by the searched another communication apparatus with information of the communication apparatus, and
   wherein the role of the communication apparatus is decided based on a result of the comparison.

6. The apparatus according to claim 1, wherein information sent by the searched another communication apparatus comprises time information related to operation for communication parameter setting at the searched another communication apparatus.

7. The apparatus according to claim 1, wherein the computer is further configured to receive identification information of the searched another communication apparatus from the searched another communication apparatus.

8. The apparatus according to claim 1, wherein the computer is further configured to provide the communication parameters to the searched another communication apparatus within a network created by the communication apparatus.

9. The apparatus according to claim 1, wherein the computer is further configured to receive the communication parameter from a provider which provides the communication parameter, in a case where the provider is searched.

10. The apparatus according to claim 9, wherein the computer is further configured to receive the communication parameter from the provider within a network created by the provider.

11. The apparatus according to claim 1, wherein the computer is further configured to communicate wirelessly with the searched another communication apparatus, based on the provided communication parameter.

12. The apparatus according to claim 11, wherein the computer communicates wirelessly with the searched another communication apparatus, in accordance with a user operation after providing the communication parameter.

13. The apparatus according to claim 1, wherein the part of the plurality of the communication channels is communicated with the searched another communication apparatus.

14. The apparatus according to claim 1, wherein the wireless network is a wireless LAN complying with IEEE 802.11 standard series.

15. The apparatus according to claim 1, wherein the wireless network is an ad hoc network.

16. The apparatus according to claim 1, wherein the computer is further configured not to execute the second search process if the another communication apparatus serving as a provider is searched in the first search process.

17. A communication method for a communication apparatus, comprising:

executing, in a switched manner, a first search process for searching another communication apparatus on a plurality of communication channels and a second search process for searching another communication apparatus by sending, on a specified part of the plurality of communication channels, a probe request that contains an information element indicating that the communication apparatus has a communication parameter automatic setting processing function;

deciding a role of the communication apparatus during the communication parameter automatic setting processing performed between the communication apparatus and a searched another communication apparatus; and providing, if the decided role is a role as a provider for providing a communication parameter for a wireless network, the communication parameter to the searched another communication apparatus, wherein the communication parameter is a parameter necessary for wireless communication, which includes one of SSID, an encryption method, an encryption key, an authentication method, and an authentication key.

18. The method according to claim 17, wherein the search processes are switched from the second search process to the first search process.

19. The method according to claim 17, wherein the search processes are switched from the first search process to the second search process.

20. The method according to claim 17, wherein the role of the communication apparatus is decided as a role of a receiver for receiving the communication parameter from a provider which provides the communication parameter, in a case where the provider is searched.

21. The method according to claim 17, further comprising, in a case where the searched another communication apparatus has not been determined to serve as a provider for providing a communication parameter or a receiver for receiving a communication parameter from the provider, comparing information sent by the searched another communication apparatus with information of the communication apparatus, wherein the role of the communication apparatus is decided based on a result of the comparison.

22. The method according claim 17, wherein the communication parameter is provided to the searched another communication apparatus within a network created by the communication apparatus.

23. The method according to claim 17, further comprising receiving the communication parameter from a provider which provides the communication parameter, in a case where the provider is searched.

24. The method according to claim 17, wherein if the decided role is a role as a provider, a plurality of communication parameters are provided to the searched another communication apparatus and the plurality of communication parameters comprise at least one of an encryption method, an encryption key, an authentication method, and an authentication key.

25. The method according to claim 17, wherein if the decided role is a role as a provider, a plurality of communication parameters are provided to the searched another communication apparatus and the plurality of communication parameters comprise a network identifier, an encryption method, an encryption key, an authentication method, and an authentication key.

26. The method according to claim 17, further comprising communicating wirelessly with the searched another communication apparatus, based on the provided communication parameter, wherein wireless communication with the searched another communication apparatus is executed with the searched another communication apparatus, in accordance with a user operation after providing the communication parameter.

27. A computer-readable storage medium storing a computer program which, when executed by a computer, causes the computer to perform a control method for a communication apparatus, the control method comprising:

executing, in a switched manner, a first search process for searching another communication apparatus on a plurality of communication channels and a second search process for searching another communication apparatus by sending, on a specified part of the plurality of communication channels, a probe request that contains an information element indicating that the communication apparatus has a communication parameter automatic setting processing function;

deciding a role of the communication apparatus during the communication parameter automatic setting processing performed between the communication apparatus and a searched another communication apparatus; and providing, if the decided role is a role as a provider for providing a communication parameter for a wireless network, the communication parameter to the searched another communication apparatus, wherein the communication parameter is a parameter necessary for wireless communication, which includes at least one of SSID, an encryption method, an encryption key, an authentication method, and an authentication key.

* * * * *